(12) United States Patent
Takeda et al.

(10) Patent No.: US 11,240,819 B2
(45) Date of Patent: Feb. 1, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 93 days.

(21) Appl. No.: 16/622,830

(22) PCT Filed: Jun. 15, 2017

(86) PCT No.: PCT/JP2017/022210
§ 371 (c)(1),
(2) Date: Dec. 13, 2019

(87) PCT Pub. No.: WO2018/229951
PCT Pub. Date: Dec. 20, 2018

(65) Prior Publication Data
US 2021/0153202 A1  May 20, 2021

(51) Int. Cl.
*H04W 72/04* (2009.01)
*H04W 56/00* (2009.01)
*H04W 24/08* (2009.01)
*H04L 1/00* (2006.01)

(52) U.S. Cl.
CPC ....... *H04W 72/0493* (2013.01); *H04L 1/0068* (2013.01); *H04W 24/08* (2013.01); *H04W 56/001* (2013.01); *H04W 72/042* (2013.01); *H04W 72/0446* (2013.01)

(58) Field of Classification Search
CPC ........... H04W 72/0493; H04W 72/042; H04W 72/0446; H04W 24/08; H04W 56/001; H04L 1/0068
See application file for complete search history.

(56) References Cited

U.S. PATENT DOCUMENTS

2014/0334416 A1  11/2014 Ko et al.
2019/0356524 A1* 11/2019 Yi .......................... H04W 48/16

OTHER PUBLICATIONS

U.S. Appl. No. 62/513,968, filed Jun. 1, 2017 . (Year: 2017).*
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)"; Mar. 2010 (149 Pages).
LG Electronics; "Remaining issues on M-PDCCH transmission"; 3GPP TSG RAN WG1 Meeting #83, R1-156840; Anaheim, USA; Nov. 15-22, 2015 (5 pages).

(Continued)

*Primary Examiner* — Melvin C Marcelo
(74) *Attorney, Agent, or Firm* — Osha Bergman Watanabe & Burton LLP

(57) ABSTRACT

A terminal is disclosed including a receiver that receives information on a control resource set including a candidate of a downlink control channel, and a processor that assumes a resource corresponding to the downlink control channel is an unavailable resource for downlink data when the control resource set overlaps with the downlink data. In other aspects, a radio communication method for a terminal is also disclosed.

10 Claims, 25 Drawing Sheets

(56) References Cited

OTHER PUBLICATIONS

Huawei, HiSilicon "Remaining details of M-PDCCH repetition for MTC"; 3GPP TSG RAN WG1 Meeting #82bis, R1-155112; Malmo, Sweden; Oct. 5-9, 2015 (6 pages).
Intel Corporation; "Clarification on Downlink Assignment using EPDCCH"; 3GPP TSG RAN WG1 Meeting #75, R1-135097; San Francisco, USA; Nov. 11-15, 2015 (5 pages).
CATT; "E-PDCCH resource indication"; 3GPP TSG RAN WG1 Meeting #70, R1-123223; Qingdao, China; Aug. 13-17, 2015 (2 pages).
International Search Report issued in PCT/JP2017/022210 dated Aug. 22, 2017 (5 pages).
Written Opinion of the International Searching Authority issued in PCT/JP2017/022210 dated Aug. 22, 2017 (4 Pages).
Office Action issued in Russian Application No. 2019143908/07; dated Oct. 14, 2020 (8 pages).
Extended European Search Report issued in counterpart European Patent Application No. 17913575.1, dated Nov. 27, 2020 (9 pages).
Samsung; "DL resource allocation: Time Domain Aspects"; 3GPP TSG RAN WG1 Meeting #89, R1-1708018; Hangzhou, China; May 15-19, 2017 (4 pages).
Huawei, HiSilicon; "Resource sharing between NR-PDCCH and data"; 3GPP TSG RAN WG1 Meeting #89, R1-1708144; Hangzhou, China; May 15-19, 2017 (12 pages).
Office Action issued in the counterpart Japanese Patent Application No. 2019-524674, dated Jun. 9, 2020 (10 pages).
ZTE; "Resource sharing between PDCCH and PDSCH"; 3GPP TSG RAN WG1 Meeting #89, R1-1707163; Hangzhou, China; May 15-19, 2017 (9 pages).
Huawei, HiSilicon; "Resource multiplexing of downlink control and data"; 3GPP TSG RAN WG1 Meeting #89, R1-1706948; Hangzhou, China; May 15-19, 2017 (5 pages).
LG Electronics; "Discussion on multiplexing between control and data"; 3GPP TSG RAN WG1 Meeting #89, R1-1707630; Hangzhou, P.R. China; May 15-19, 2017 (3 pages).
Guangdong OPPO Mobile Telecom; "On resource sharing between PDCCH and PDSCH"; 3GPP TSG RAN WG1 meeting #89, R1-1707708; Hangzhou, PR China; May 15-19, 2017 (6 pages).
MediaTek Inc.; "Resource sharing between PDCCH and PDSCH"; 3GPP TSG RAN WG1 Meeting #89, R1-1707823; Hangzhou, P.R. China; May 15-19, 2017 (5 pages).
Samsung; "Multiplexing NR-PDCCH and PDSCH"; 3GPP TSG RAN WG1 Meeting #89, R1-1707993; Hangzhou, China; May 15-19, 2017 (5 pages).
Sharp; "Indication of PDSCH starting position for NR"; 3GPP TSG RAN WG1 Meeting #89, R1-1708371; Hangzhou, China; May 15-19, 2017 (4 pages).
Office Action in counterpart Chilean Patent Application No. 201903663 dated Mar. 11, 2021 (19 pages).
5G; "Study on New Radio (NR) access technology (release 14)"; 3GPP TR 38.912 V14.0.0, May 2017 (77 pages).
3GPP TSG RAN WG1 Meeting #89; R1-1708303 "Design of SS block and SS burst set" Motorola Mobility, Lenovo Hangzhou, P. R. China; May 15-19, 2017 (4 pages).
Office Action issued in Korean Application No. 10-2020-7000172; dated Sep. 9, 2021 (10 pages).

\* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specifications of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th Generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

A radio base station controls the allocation (scheduling) of data for a user terminal, and reports the schedule of data to the user terminal using downlink control information (DCI). The downlink control information is transmitted, for example, by using a downlink control channel (PDCCH (Physical Downlink Control CHannel)) that is allocated to the top part of a subframe. The user terminal monitors the downlink control channel and performs receiving processes (demodulation process, decoding process, etc.), and, furthermore, controls the receipt of DL data and/or the transmission of uplink data based on downlink control information that is received.

In existing LTE systems, transmission of a downlink control channel (PDCCH/EPDCCH) is controlled by using an aggregation of one or more control channel elements (CCEs/ECCEs). Also, each control channel element is comprised of a number of resource element groups (REGs/EREGs). Resource element groups are also used when control channels are mapped to resource elements (REs).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), studies are in progress to allocate (map) fields for transmitting downlink control information in a flexible manner, rather than fixedly. However, the above fields, when allocated in a flexible manner, might conflict (collide) with information or signals that are allocated apart from downlink control information. For this reason, when conventional mapping of REGs is used, a decline in the quality of communication, a drop in resource efficiency and the like might pose problems.

It is therefore an object of the present invention to provide a user terminal and a radio communication method, whereby, even when fields (control resource set) for transmitting downlink control information are allocated in a flexible manner, it is still possible to reduce the decline in the quality of communication, the drop in resource efficiency, and so forth.

Solution to Problem

According to one aspect of the present invention, a user terminal has a receiving section that receives a downlink signal and a control section that, when the downlink signal is different from a signal that represents downlink control information, and a radio resource of the downlink signal overlaps a monitoring field for downlink control channel detection, applies a predetermined control to the monitoring field for downlink control channel detection.

Advantageous Effects of Invention

According to the present invention, it is possible to suppress the decline in the quality of communication and/or reduction of utilization efficiency of resources even in the case of flexibly arranging an area for transmitting downlink control information.

DESCRIPTION OF EMBODIMENTS

Figure 1:
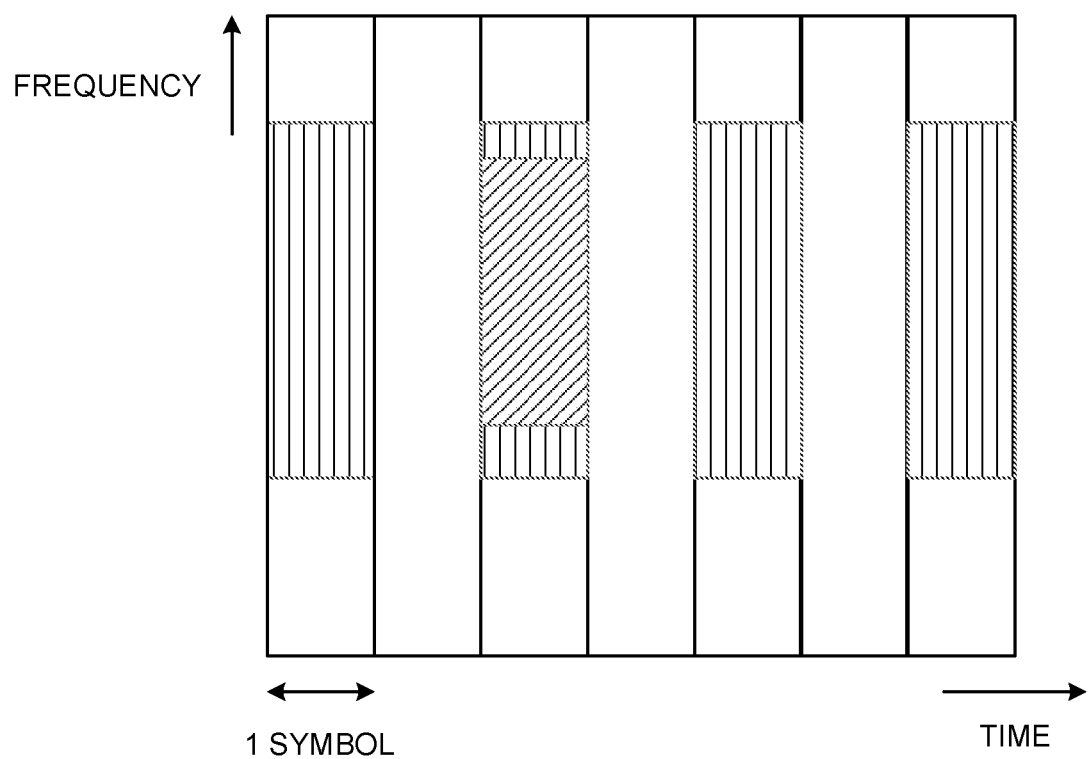
FIG. 1 is a diagram to illustrate an example of allocation of broadcast information and control resource sets in radio resources.

In existing LTE systems, a base station transmits downlink control information (DCI) to UE by using downlink control channels (for example, PDCCH (Physical Downlink Control CHannel), EPDCCH (Enhanced PDCCH), etc.). Transmission of downlink control information may be interpreted as meaning transmission of downlink control channels.

DCI may be scheduling information to include at least one of, for example, time/frequency resources for scheduling data, transport block information, data modulation scheme information, HARQ retransmission information, and information related to demodulation RS. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant."

DL assignment and/or UL grant may carry information related to at least one of the resource, sequence, transmission format and so on of the channel for transmitting UL control signals (UCI (Uplink Control Information)) such as HARQ-ACK feedback and/or channel measurement information (CSI (Channel State Information)) in response to DL data, and so on. Also, DCI to schedule UL control signals (UCI (Uplink Control Information)) may be defined apart from DL assignment and UL grant.

The UE monitors a set of a predetermined number of downlink control channel candidates based on configurations. To "monitor" in this case means, for example, attempting to decode every downlink control channel in this set, with respect to a target DCI format. Such decoding is also referred to as "blind decoding (BD)" or "blind detection." A downlink control channel candidate may be referred to as a "BD candidate," a "(E)PDCCH candidate," and so on.

A set of downlink control channel candidates (multiple downlink control channel candidates) to be monitored is also referred to as a "search space." A base station allocates DCI in a predetermined downlink control channel candidate included in the search space. The UE performs blind decoding for one or more candidate resources in the search space, and detects DCI addressed to the UE. The search space may be configured by high layer signaling that is common between users, or may be configured by user-specific high layer signaling. Also, two or more search spaces may be configured for a user terminal, in the same carrier.

In existing LTE, a number of aggregation levels (ALs) are defined for search spaces for the purpose of link adaptation. AL corresponds to the number of control channel elements (CCEs)/enhanced control channel elements (ECCEs) that constitute DCI. Also, a search space is configured so that there are multiple downlink control channel candidates for a given AL. Each downlink control channel candidate is comprised of one or more resource units (CCEs and/or ECCEs).

Cyclic redundancy check (CRC) bits are attached to DCI. These CRC bits are masked (scrambled) using UE-specific identifiers (for example, cell-radio network temporary identifiers (C-RNTIs)) or a system-common identifier. UE can detect DCI, in which the CRC bits are scrambled using the C-RNTIS for the user terminal, and DCI, in which the CRC bits are scrambled using a system-common identifier.

Also, a search space may be a common search space, which is configured for UEs on a shared basis, or a UE-specific search space, which is configured for an individual UE. When UE-specific search spaces for the existing LTE PDCCH are used, the ALs (=the numbers of CCEs) are 1, 2, 4 and 8. The numbers of BD candidates defined in association with ALs=1, 2, 4 and 8 are 6, 6, 2 and 2, respectively.

Now, 5G/NR are required to support flexible use of numerologies and frequencies, and realize dynamic frame formats. Here, a numerology refers to communication parameters related to the frequency domain and/or the time domain (for example, at least one of the subcarrier spacing (SC'S), the bandwidth, the length of symbols, the length of cyclic prefixes (CPs), the length of transmission time intervals (TTIs), the number of symbols per TTI, the format of radio frames, the filtering process, the windowing process and so on).

Also, future radio communication systems (for example, 5G, NR, etc.) are expected to realize various radio communication services so as to fulfill mutually varying requirements (for example, ultra-high speed, large capacity, ultralow latency, etc.). For example, 5G/NR are under study to provide radio communication services referred to as "eMBB (enhanced Mobile Broad Band)," "Iota (Internet of Things)," "mMTC (massive Machine Type Communication)," "M2M (Machine To Machine)," "RLC (Ultra Reliable and Low Latency Communications)," and so on.

Studies are in progress to allocate (map) fields (control resource sets) for transmitting downlink control information in a flexible manner, rather than fixedly. UE can detect a downlink control channel (or a control channel for NR (NR-PDCCH)) by monitoring a predetermined control resource set. Note that a control resource set refers to a set of candidate resources for transmitting a downlink control channel, and may be referred to as a "CORSET (Control Resource SET)," a "control subband," a "control channel search space," a "search space set," a "search space resource set," a "control field," a "control subband," an "NR-PDCCH field," and so on.

Note that a control resource set may be one that is needed to receive minimum system information (which may be referred to as, for example, "RIMS (Remaining Minimum System Information)").

Control resource sets, when allocated in a flexible manner as described above, might content (collide) with information or signals that are allocated apart from downlink control information or from information for detecting downlink control information. Consequently, it may not be possible to allocate downlink control channels in control resource sets. In this case, the UE monitors control resource sets, but might even decode resources to which no downlink control information is mapped. For this reason, a decline in the quality of communication, a drop in resource efficiency and the like might pose problems. Note that the locations to map control resource sets may be reported in advance from the network side to the UE by using higher layer signaling or the like.

For example, as illustrated in FIG. 1, collisions with broadcast information sent from the network might occur. In FIG. 1, control resource sets are allocated to the first, third, fifth and seventh symbols in time-frequency resources. However, in the third symbol, broadcast information is allocated to resource for a control resource set. Consequently, although UE monitors the control resource set, given that no downlink control channel (downlink control information) is mapped in the colliding resource, the UE ends up performing unnecessary processes.

Now, assuming the case in which the mapping locations of a control resource set (monitoring area for downlink control channel detection) that is arranged in a flexible manner (for example, quasi-statically arranged) and information or signals other than downlink control information collide, the present inventors have focused on the handling of the control resource set, and arrived at the present invention.

Now, embodiments of the present invention will be described below in detail with reference to the accompanying drawings. The radio communication methods according to the herein-contained embodiments may be used individually or may be used in combination.

Note that, in the following embodiments, the prefix "NR-" that is used in relationship to signals and channels may be omitted.

(Radio Communication Method)

First Embodiment

With the first embodiment of the present invention, a case will be described in which broadcast information collides with a control resource set. Note that the broadcast information may carry a broadcast channel (PBCH (Physical Broadcast CHannel)) and synchronization signals (for example, the PSS (Primary Synchronization Signal)/SSS (Secondary Synchronization Signal)) that are transmitted in predetermined resource locations (symbol and frequency resources), or may carry resource units (for example, SS (Synchronization Signal) blocks) comprised of a broadcast channel and synchronization signals.

Now, various examples of the first embodiment will be described below.

Example 1-1

Figure 2:
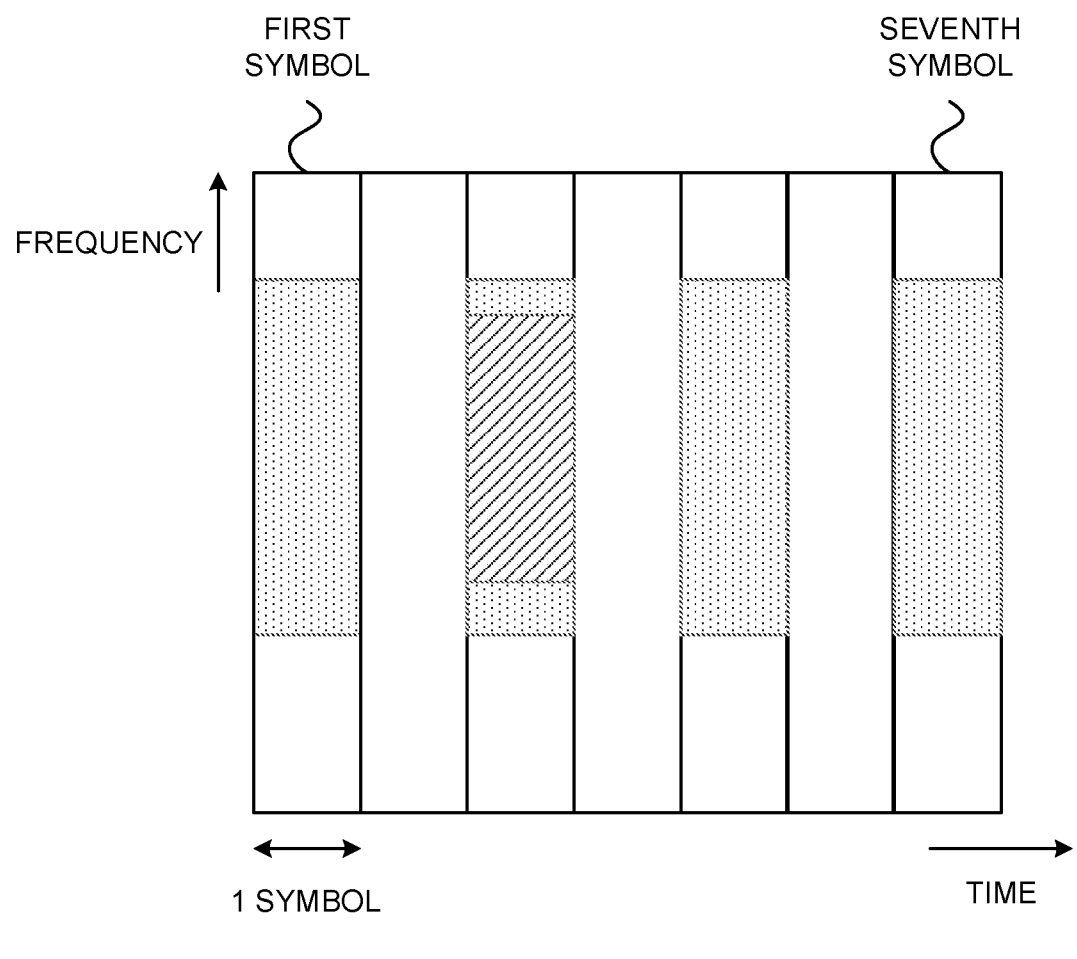
FIG. 2 is a diagram to illustrate an example of allocation of broadcast information and control resource sets in radio resources according to a first embodiment of the present invention.

With example 1-1, the network (for example, eNB, gNB, etc.) is prohibited from allocating control resource sets that might collide with broadcast information. For example, as illustrated in FIG. 2, control resource sets are allocated to (configured in) the first, third, fifth and seventh symbols (in a cycle of 2 symbols). However, a resource where broadcast information is mapped collides with the control resource set of the third symbol, and the network prohibits the transmission of a downlink control channel using the above control resource set in the first, third, fifth and seventh symbols. The user terminal assumes no control resource sets are allocated to resources that might collide with the broadcast information.

According to example 1-1, collisions between control resource sets and information or signals other than downlink control information can be prevented on the network side in advance. Consequently, UE does not perform monitoring, decoding process and so forth, for control resource sets to which information or signals other than downlink control information are mapped, thereby avoiding unnecessary processes.

Example 1-2

Next, example 1-2 will be described below. According to example 1-2, UE does not monitor (skips monitoring) control resource sets that collide with broadcast information.

Figure 3:
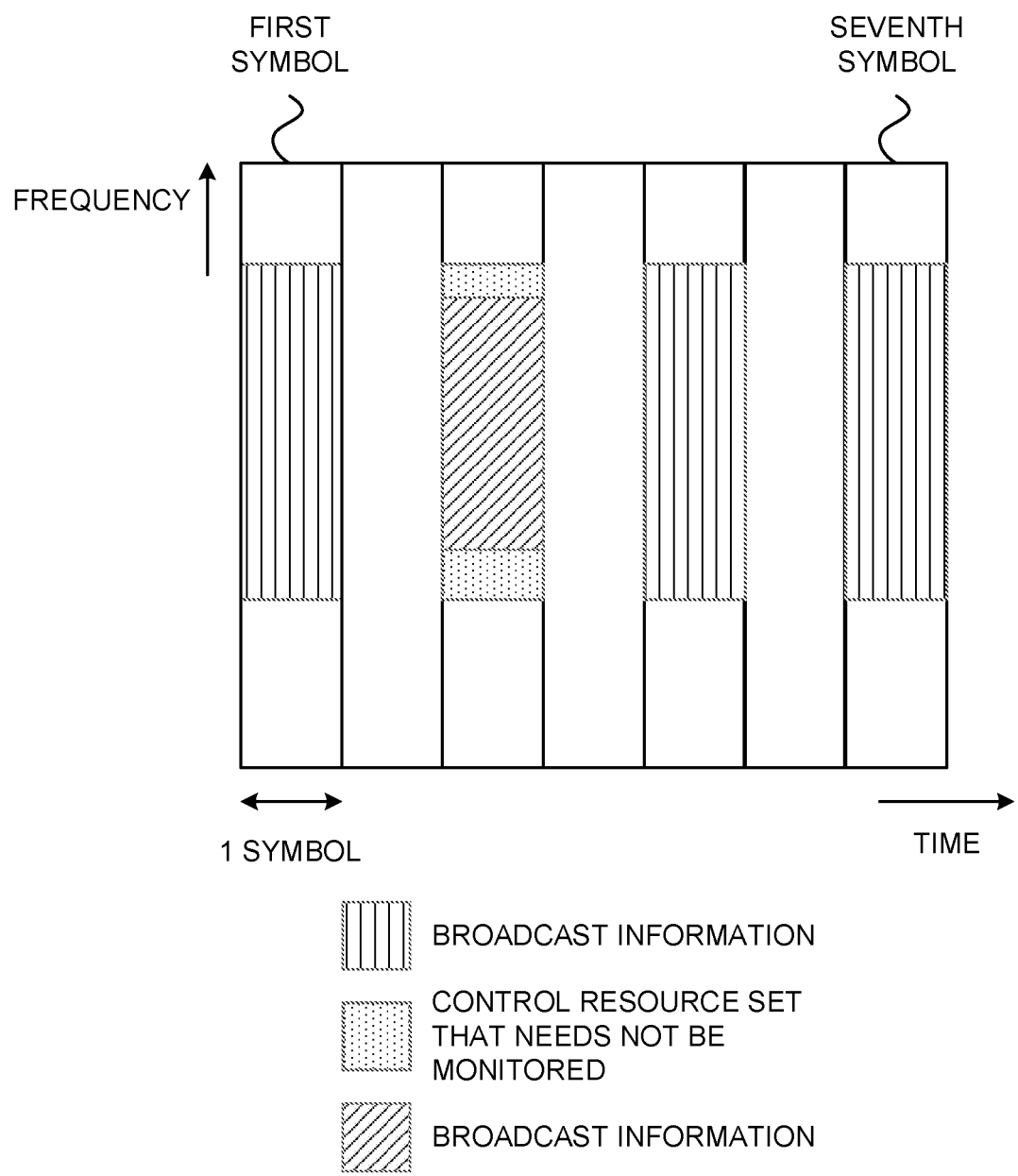
FIG. 3 is a diagram to illustrate an example of allocation of broadcast information and control resource sets in radio resources according to the first embodiment.

The control resource sets illustrated in FIG. 3 are configured in the first, third, fifth and seventh symbols. However, as in FIG. 1 and FIG. 2, in the third symbol, the control resource set collides with broadcast information.

As described earlier, the locations of control resource sets (frequency-time resources) are reported to (or configured semi-statically in) UE, in advance, by higher layer signaling or the like. The location of the broadcast information (frequency-time resource) may be configured semi-statically, similar to the control resource sets, or may be determined in advance in the specification.

The UE detects (specifies) the control resource set that collides with the broadcast information, based on information to indicate locations that are reported or determined in advance. The UE skips monitoring only the detected control resource set. To be more specific, in FIG. 3, the monitoring of the control resource set configured in the third symbol is skipped.

According to example 1-2 the UE does not perform monitoring, decoding process and so forth, only for control resource sets that collide with broadcast information, thereby avoiding unnecessary processes, and reducing the terminal's battery consumption. As a result of this, even when control resource sets are configured in a flexible manner, it is still possible to reduce the decline in the quality of communication, the drop in resource efficiency, and so forth.

Example 1-3

Next, example 1-3 will be described below. According to example 1-3, a control resource set that collides with broadcast information is shifted in the time-axis direction, and prevented from colliding with the broadcast information.

Figure 4:
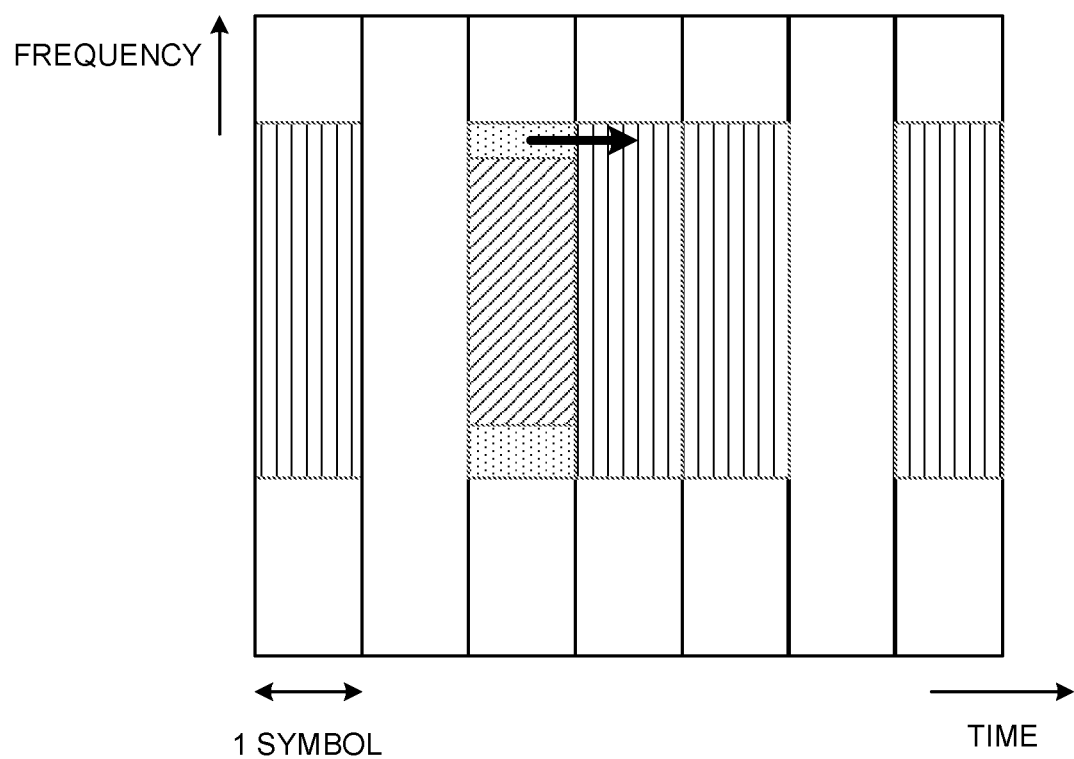
FIG. 4 is a diagram to illustrate an example of allocation of broadcast information and control resource sets in radio resources according to the first embodiment.

An example of the configuration according to example 1-3 is illustrated in FIG. 4. Here, as in FIG. 3 of example 1-2, control resource sets are configured in the first, third, fifth and seventh symbols, but, in the third symbol, the control resource set collides with broadcast information.

The UE detects (specifies) the control resource set that collides with the broadcast information, based on information to indicate locations that are reported or determined in advance. For this detected set control resource set alone, the UE shifts the allocation location by 1 symbol in the time-axis direction, and monitors the control resource set there. In FIG. 4, the UE shifts the detected control resource set of the third symbol to the fourth symbol, while maintaining the frequency as it is, and monitors the control resource set there.

Note that the network knows in advance that broadcast information and the control resource set of the third symbol will collide, so that the network maps the broadcast information to the third symbol, and configures the control resource set that was planned to be configured in the third symbol, in the fourth symbol (effective symbol) that does not collide with broadcast information. Alternatively, although the network can configure a control resource set in the third symbol where broadcast information is allocated, if their collision is found out, the user terminal may monitor the control resource set in the symbol where the configured information is shifted through a predetermined number of symbols (for example, 1 symbol), without configuration from the network.

According to example 1-3, a control resource set that collides with broadcast information can be shifted to an effective resource that does not collide with broadcast information. Consequently, UE does not perform monitoring, decoding processes and so forth, for resources that collide with broadcast information, thereby avoiding unnecessary processes.

Also, the downlink control channel that is mapped to the colliding control resource set is mapped to a resource (effective resource) that does not collide with broadcast information, so that the drop in resource efficiency and the like can be reduced. Furthermore, there is no need to wait for the next control resource set of the colliding control resource set to transmit a downlink control channel, so that the latency in transmission and so on can be reduced.

Note that, in example 1-3, the amount of shift in the time-axis direction is 1 symbol, but this is by no means limiting. For example, if there are multiple symbols between consecutive control resource sets, a control resource set may be shifted to a resource that is located on one of the intervening symbols and that does not collide with broadcast information.

Example 1-4

Next, example 1-4 will be described below. In example 1-4, the control resource set that collides with the broadcast information is shifted in the direction of the frequency axis and prevented from colliding with the broadcast information.

Figure 5:
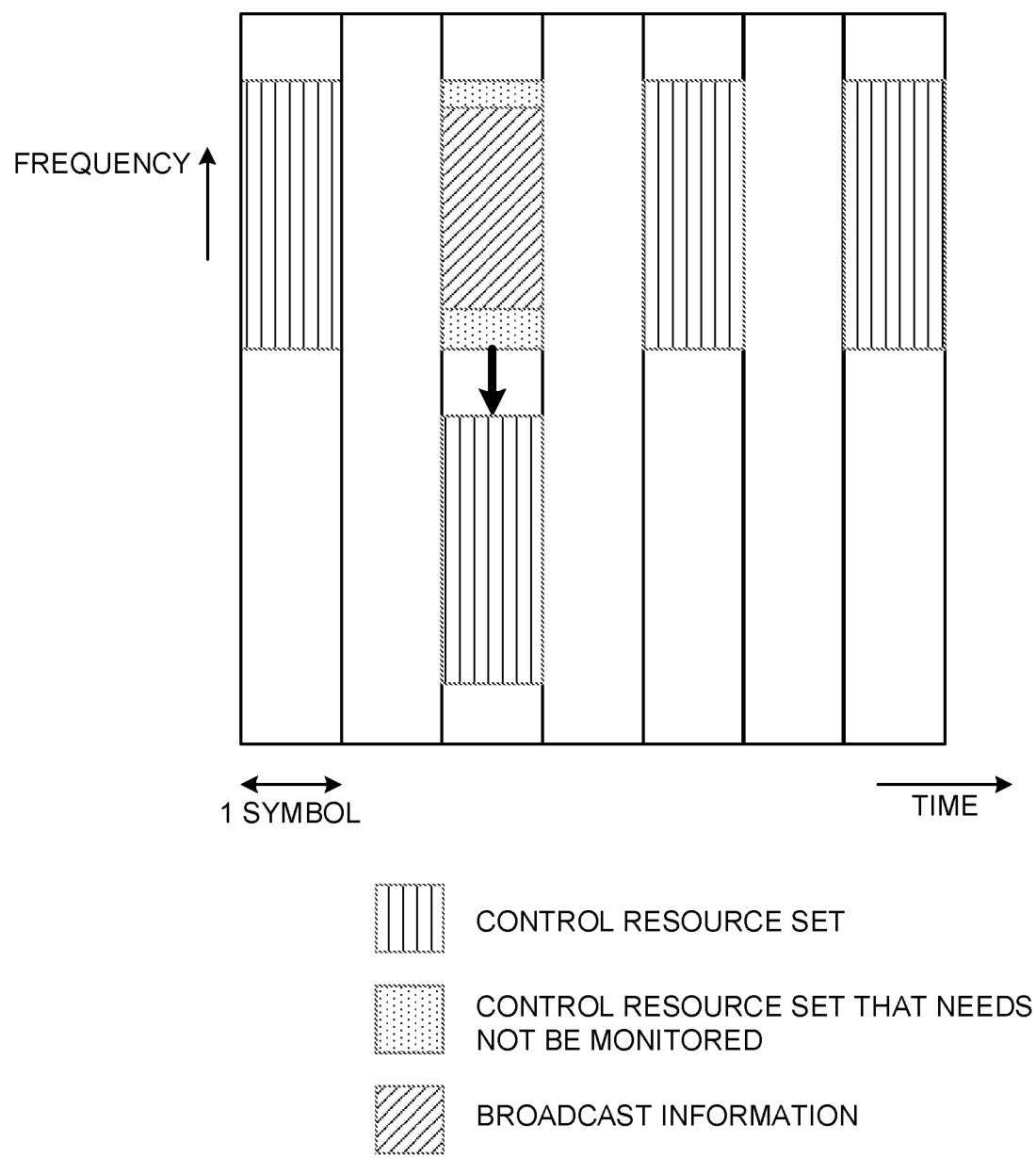
FIG. 5 is a diagram to illustrate an example of allocation of broadcast information and control resource sets in radio resources according to the first embodiment.

An example of the configuration according to example 1-4 is illustrated in FIG. 5. Here, as in FIG. 3 of example 1-2, control resource sets are configured in the first, third, fifth and seventh symbols, but, in the third symbol, the control resource set collides with broadcast information.

The UE detects (specifies) the control resource set that collides with the broadcast information, based on information to indicate locations that are reported or determined in advance. For this detected set control resource set alone, the UE shifts the allocation location in the frequency-axis direction, and monitors the control resource set there. In FIG. 5, the UE shifts the frequency of the detected control resource set of the third symbol, while maintaining the corresponding symbol as it is, and monitors the control resource set there.

Note that the network knows in advance that broadcast information and the control resource set of the third symbol will collide, so that the network maps the broadcast information to the third symbol, and configures the colliding control resource set by shifting the control resource set in the frequency direction so as not to collide with the broadcast information.

According to example 1-4, a control resource set that collides with broadcast information can be shifted to an effective resource that does not collide with broadcast information. Consequently, UE does not perform monitoring, decoding processes and so forth, for resources that collide with broadcast information, thereby avoiding unnecessary processes.

Also, the downlink control channel that is mapped to the colliding control resource set is mapped to a resource (effective resource) that does not collide with broadcast information, so that the drop in resource efficiency and the like can be reduced. Furthermore, there is no need to wait for the next control resource set of the colliding control resource set to transmit a downlink control channel, or there is no need to transmit the downlink control channel in a symbol after the colliding symbol, so that the latency in transmission and so on can be reduced.

Note that to which location (frequency resource) a control resource set is shifted in the frequency direction or what amount of shift is applied to the control resource set may be pre-configured in UE, or reported from the network.

Example 1-5

Next, example 1-5 will be described below. In example 1-5, when a control resource set collides with broadcast information, the part (resource) that collides with broadcast information is not considered as the control resource set, and only the part (resource) that does not collide (does not overlap) with the broadcast information is regarded as the control resource set and monitored.

Figure 6:
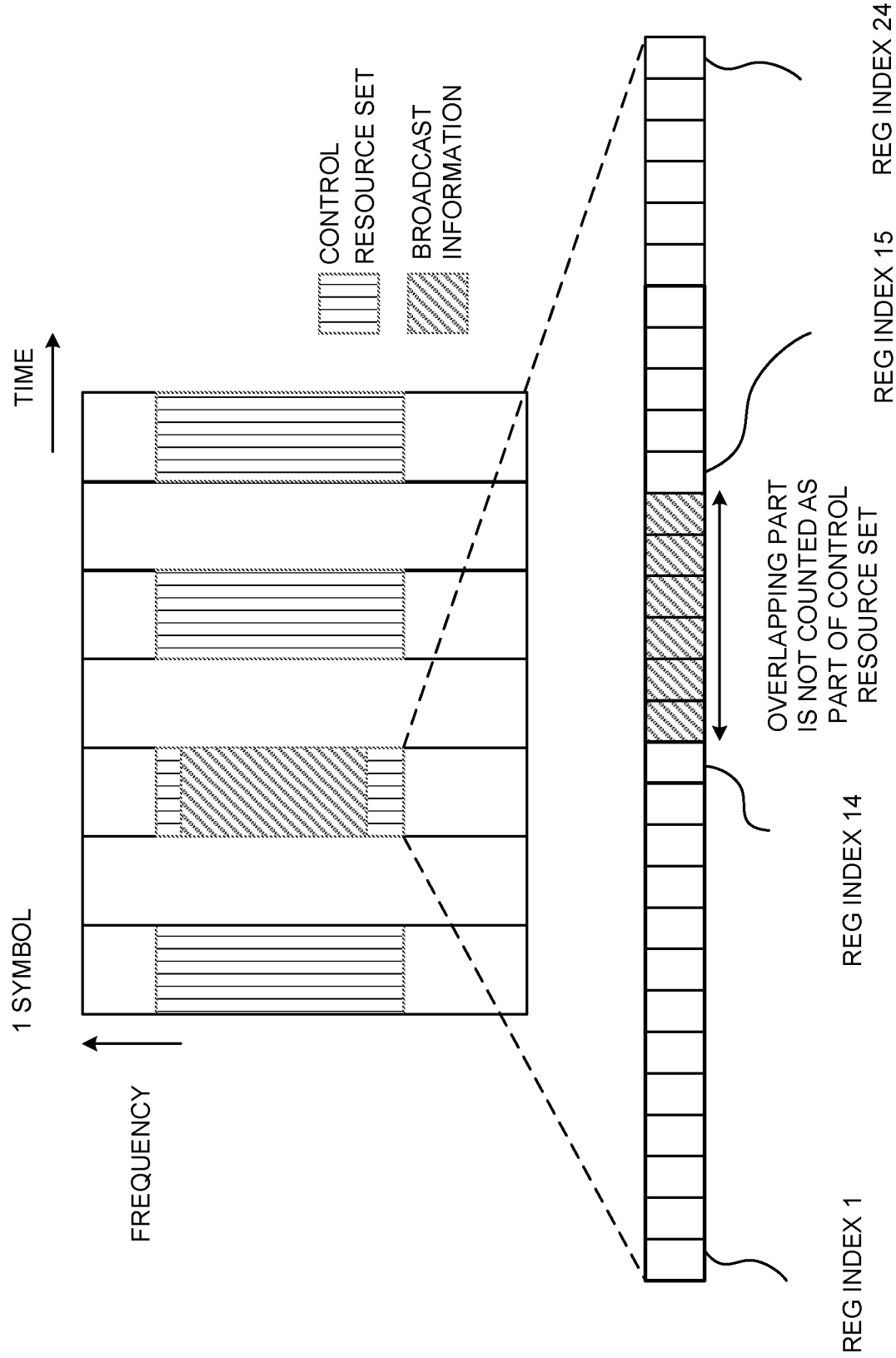
FIG. 6 is a diagram to illustrate an example of allocation of broadcast information and control resource sets in radio resources according to the first embodiment.

An example of the configuration according to example 1-5 is illustrated in FIG. 6. Here, as in FIG. 3 of example 1-2, control resource sets are configured in the first, third, fifth and seventh symbols, but, in the third symbol, the control resource set collides with broadcast information.

Downlink control channel elements are comprised of a number of resource element groups (REGs/EREGs). Resource element groups are also used when downlink control channels are mapped to resource elements (REs).

As illustrated in FIG. 6, a control resource set is comprised of 30 REGs. However, since the part (resource) that collides with broadcast information is not considered as a control resource set, no REG index is assigned.

On the other hand, parts (resources) where there is no colliding (overlapping) broadcast information are regarded as control resource sets, and therefore, REG indices are assigned. That is, the REGs with REG indices 1 to 24 are considered as a control resource set, and a downlink control channel can be allocated (mapped). That is, in the network, the REGs with REG indices 1 to 24 can be used to map a downlink control channel. Note that, referring to FIG. 6, the part (resource) that collide with broadcast information is not considered as the control resource set, and therefore the REG index 14 and the REG index 15 are assigned in a discontinuous manner.

The UE detects (specifies) the control resource set that collides with the broadcast information, based on information to indicate locations that are reported or determined in advance. The UE monitors only the portion of the detected control resource set that does not collide (do not overlap) with broadcast information. In FIG. 6, the UE performs monitoring in the CCE (per resource) associated to REG index 1-24.

According to example 1-5, a downlink control channel can be allocated using resources that do not collide (do not overlap) with broadcast information. In other words, the colliding control resource set can be utilized. Consequently, UE does not perform monitoring, decoding processes and so forth, for resources that collide with broadcast information, thereby avoiding unnecessary processes. As a result of this, even when control resource sets are configured in a flexible manner, it is still possible to reduce the decline in the quality of communication, the drop in resource efficiency, and so forth.

Note that the indices to assign to parts that do not collide (do not overlap) with broadcast information (indices 1 to 24 in FIG. 6) may be configured in advance, or reported from the network.

Example 1-6

Next, example 1-6 will be described below. In example 1-6, when a control resource set collides with broadcast information, the part (resource) that collides with broadcast information is also regarded as the control resource set and monitored. Also, in example 1-6, rate matching or puncturing is applied.

Figure 7:
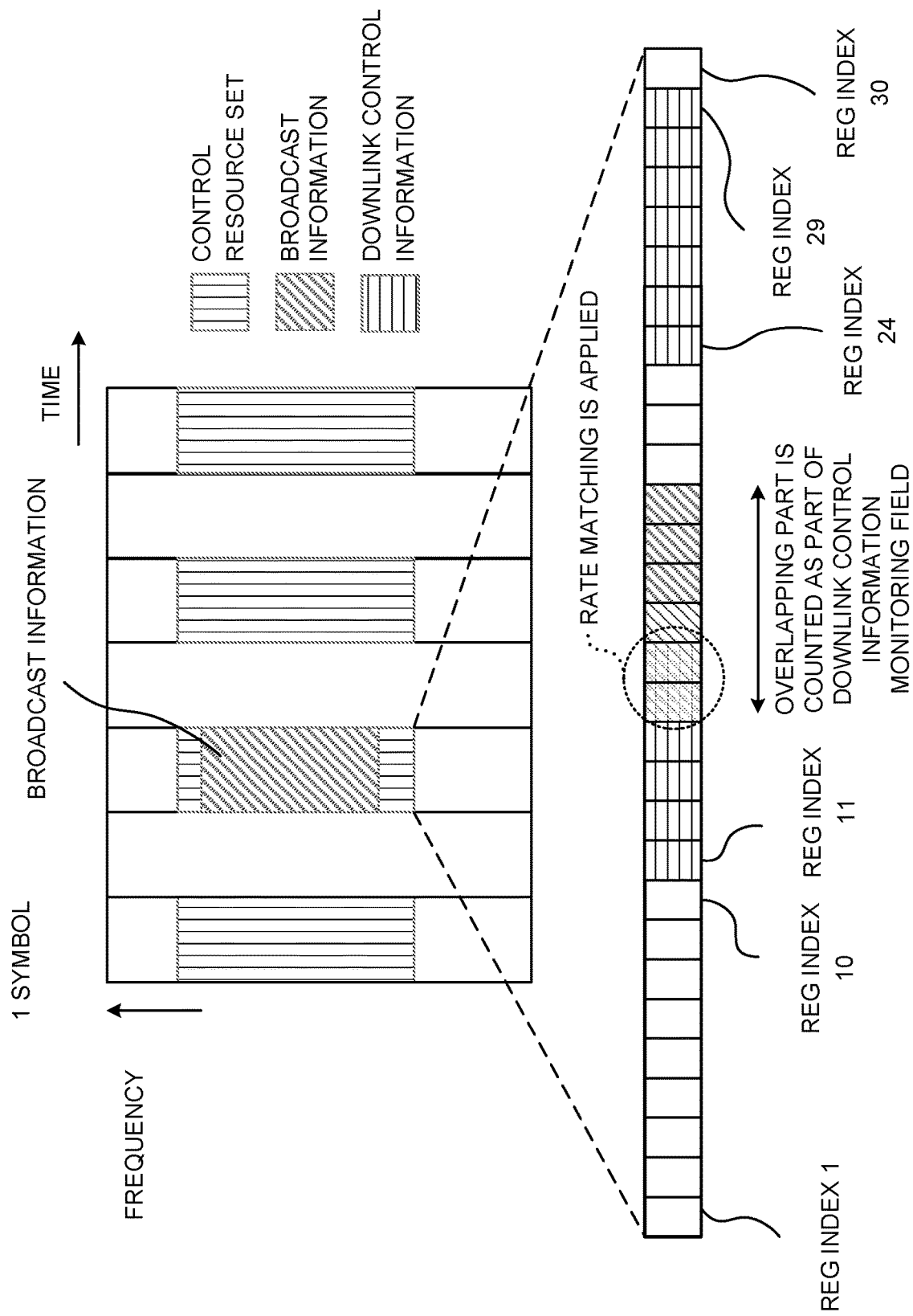
FIG. 7 is a diagram to illustrate an example of allocation of broadcast information and control resource sets in radio resources according to the first embodiment.

An example of the configuration according to example 1-6 is illustrated in FIG. 7. Here, as in FIG. 3 of example 1-2, control resource sets are configured in the first, third, fifth and seventh symbols, but, in the third symbol, the control resource set collides with broadcast information.

As in example 1-5 of FIG. 6, a control resource set is comprised of 30 REGs. However, in FIG. 7 of example 1-6, the part (resource) that collides with broadcast information is also considered as a control resource set and is processed in UE, and therefore REG indices are assigned to all of the 30 REGs.

The network first maps a downlink control channel on the assumption that the corresponding downlink control channel does not overlap with broadcast information. In FIG. 7, it is decided to map the downlink control channel to REG indices 11 to 16 (selection of mapping resources). After this, broadcast information is mapped, but since the broadcast information overlaps with the downlink control channel in REG indices 15 and 16, the broadcast information (REG indices 15 to 20) is subjected to rate matching.

The UE detects (specifies) the control resource set that collides with the broadcast information, based on information to indicate locations that are reported or determined in advance. The UE may be engaged in monitoring, in the detected control resource set, by using REG indices 1 to 30. However, in the detected control resource set, the downlink control channel and the broadcast information overlap in REG indices 15 and 16, and therefore the broadcast information is subjected to rate matching.

Rate matching here refers to controlling the number of encoded bits by taking into account the radio resources that are actually available for use. At least part of the encoded bits may be repeated if the number of encoded bits is less than the number of bits that can be mapped to radio resources that are actually available. If the number of encoded bits is greater than the number of bits that can be mapped, then part of the encoded bits may be deleted.

It may also be possible to use puncturing instead of rate matching. When puncturing is applied, although coding is performed without taking into account the amount of radio resources that are not available for use, among the radio resources broadcast information is allocated, encoded symbols are not mapped to resources that are not actually available (for example, REG indices 15 and 16).

According to example 1-6, when broadcast information is allocated to collide with a control resource set, the decoding process and/or other processes may be performed, using the broadcast information as information mapped to that control resource set. The UE can perform the monitoring process, without performing special processes (such as partial monitoring, shifting radio resources, etc.) for colliding control resource sets. As a result of this, even when control resource sets are configured in a flexible manner, it is still possible to reduce the decline in the quality of communication, the drop in resource efficiency, and so forth.

Note that, in FIG. 7, the downlink control channel corresponding to REG indices 11 to 16 and the downlink control channel corresponding to REG indices 24 to 29 may be downlink control channels for the same UE, or may be downlink control channels for different UEs.

As described above, according to the first embodiment, control resource sets are allocated in a flexible manner. As a result of this, even if control resource sets and broadcast information code with each other, the decline in the quality of communication, the drop in resource efficiency and so forth can be reduced.

Second Embodiment

Next, a second embodiment of the present invention will be described below. With the second embodiment of the present invention, a case will be described in which downlink data collides with a control resource set. Now, various examples of the second embodiment will be described below.

Example 2-1

According to example 2-1, UE does not monitor (skips monitoring) control resource sets that collide with downlink data. This is similar to example 1-2 above.

Figure 8:
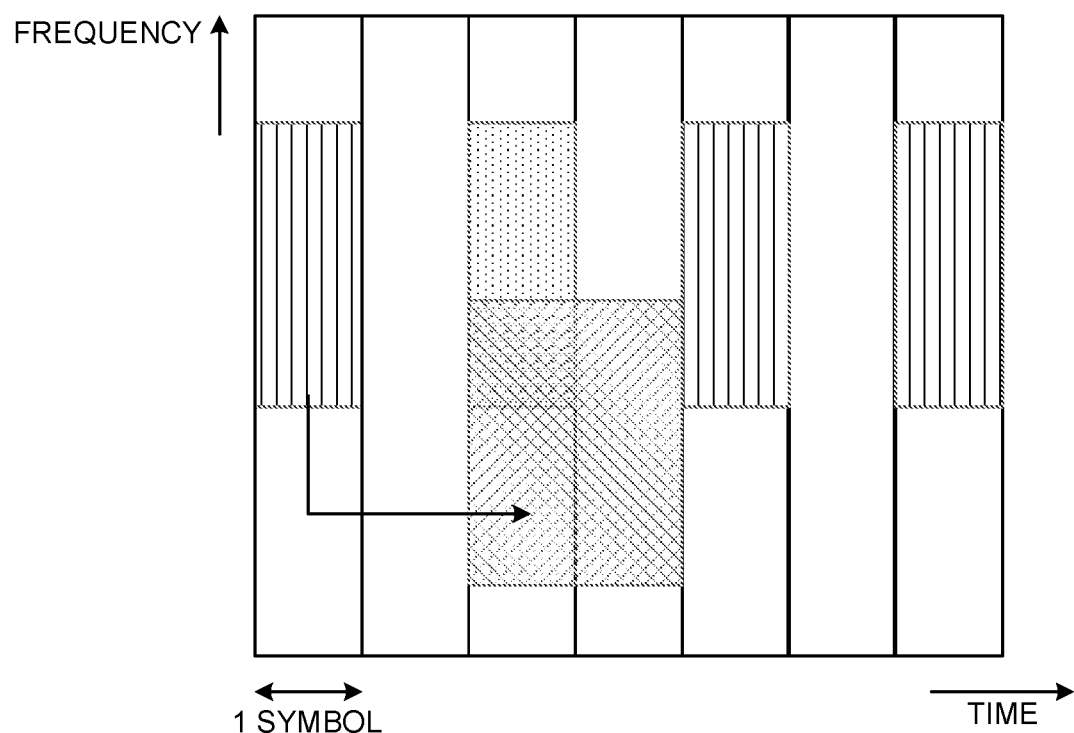
FIG. 8 is a diagram to illustrate an example of allocation of downlink data and control resource sets in radio resources according to a second embodiment of the present invention.

The control resource sets illustrated in FIG. 8 are configured in the first, third, fifth and seventh symbols. However, in the third symbol, the control resource set collides with broadcast information.

As described earlier, the locations of control resource sets (frequency-time resources) are reported to (or configured semi-statically in) UE, in advance, by higher layer signaling or the like. Also, the location of downlink data in radio resources is specified by the downlink control channel (downlink control information) transmitted in the control resource set of the first symbol, and configured semi-statically.

The UE detects (specifies) the control resource set that collides with downlink data based on information that indicates these semi-statically-configured locations. The UE skips monitoring only the detected control resource set. To be more specific, in FIG. 3, the UE skips monitoring the control resource set configured in the third symbol.

According to example 2-1, the UE does not perform monitoring, decoding process and so forth only for control resource sets that collide with downlink data, thereby avoiding unnecessary processes. As a result of this, even when control resource sets are configured in a flexible manner, it is still possible to reduce the decline in the quality of communication, the drop in resource efficiency, and so forth.

Example 2-2

Next, example 2-2 will be described below. In example 2-2, as in example 1-6, colliding control resource sets are also monitored and subjected to rate matching or puncturing.

Figure 9:
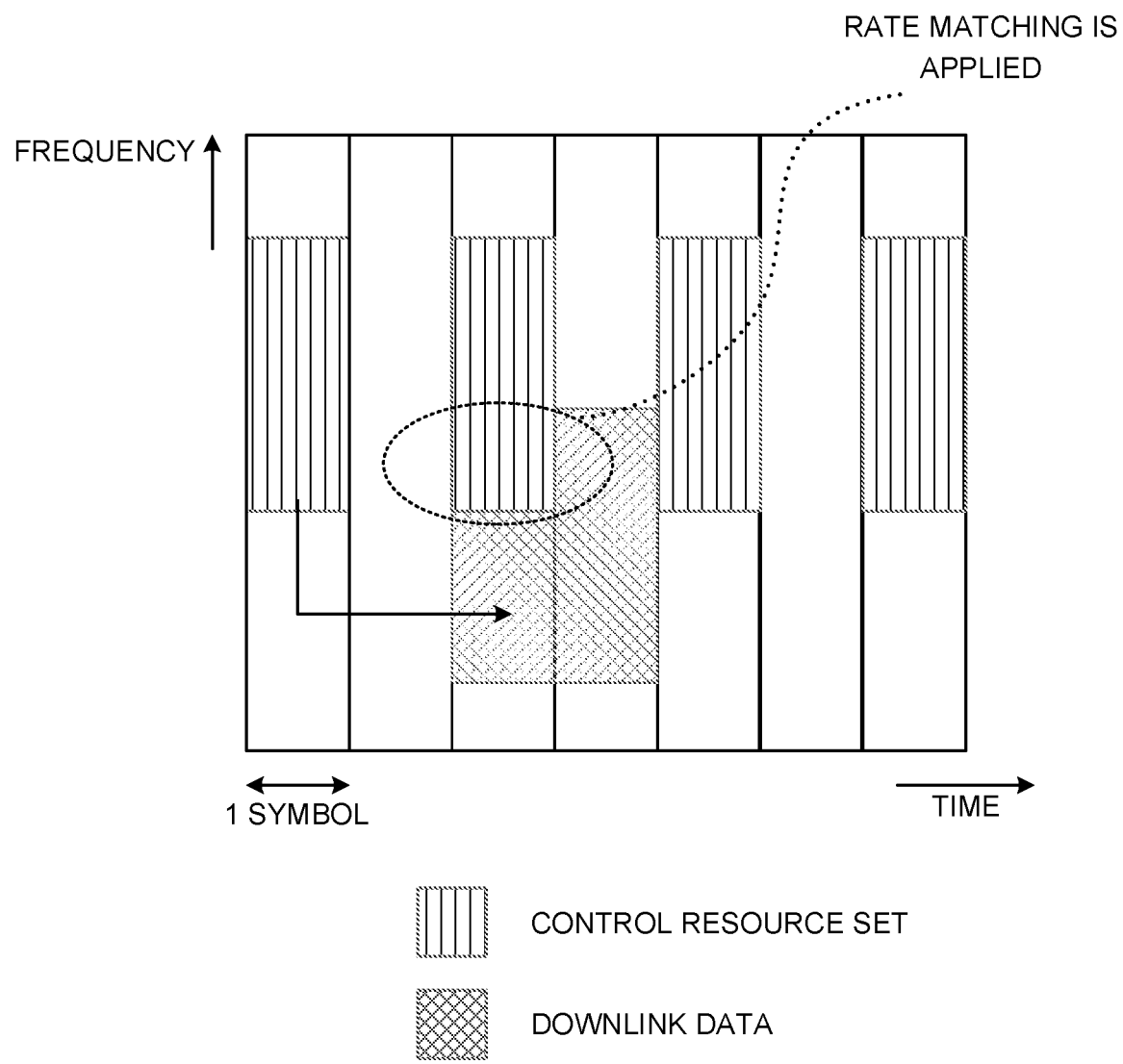
FIG. 9 is a diagram to illustrate an example of allocation of downlink data and control resource sets in radio resources according to the second embodiment.
Figure 10:
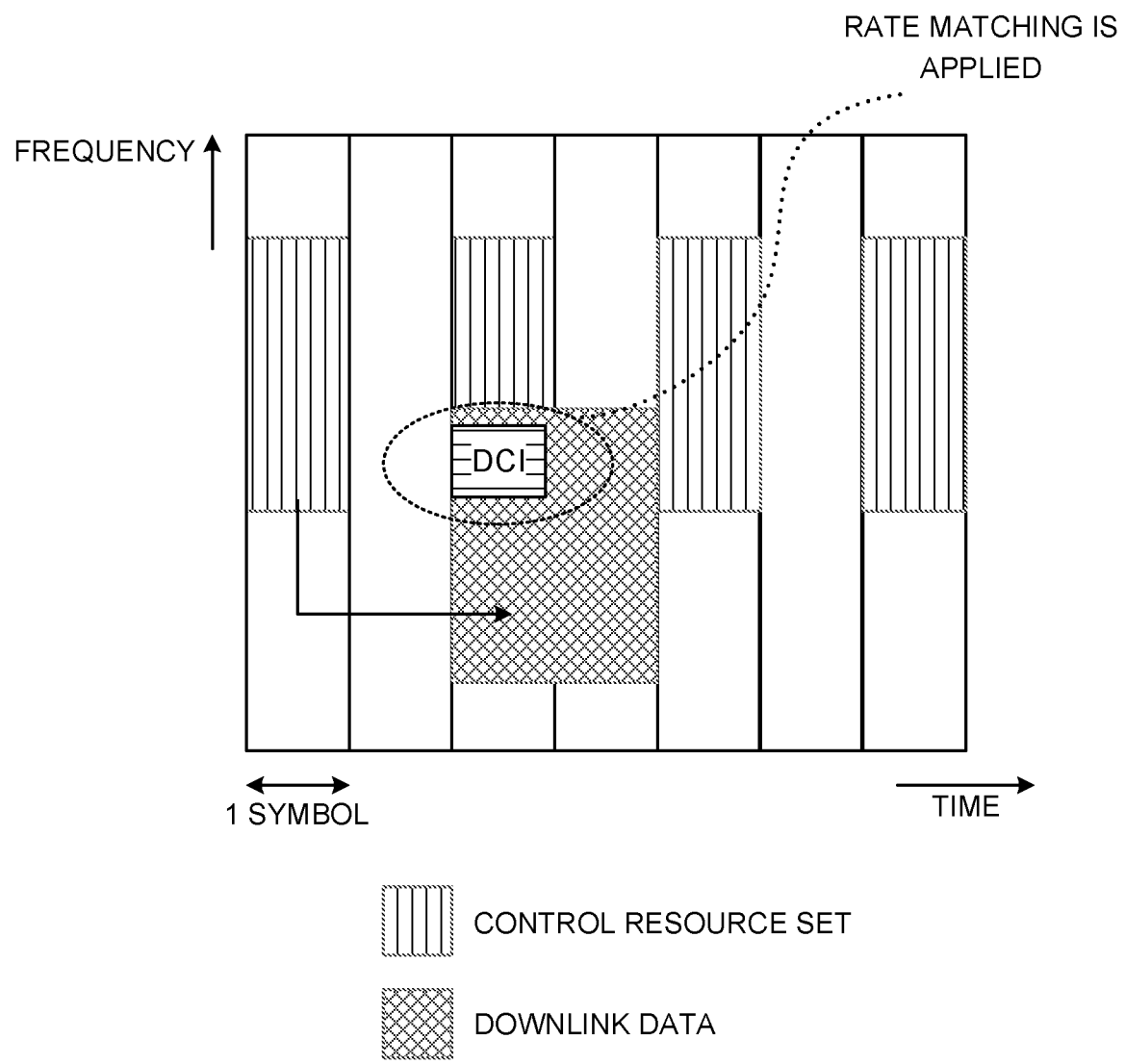
FIG. 10 is a diagram to illustrate an example of allocation of downlink data and control resource sets in radio resources according to the second embodiment.
Figure 11:
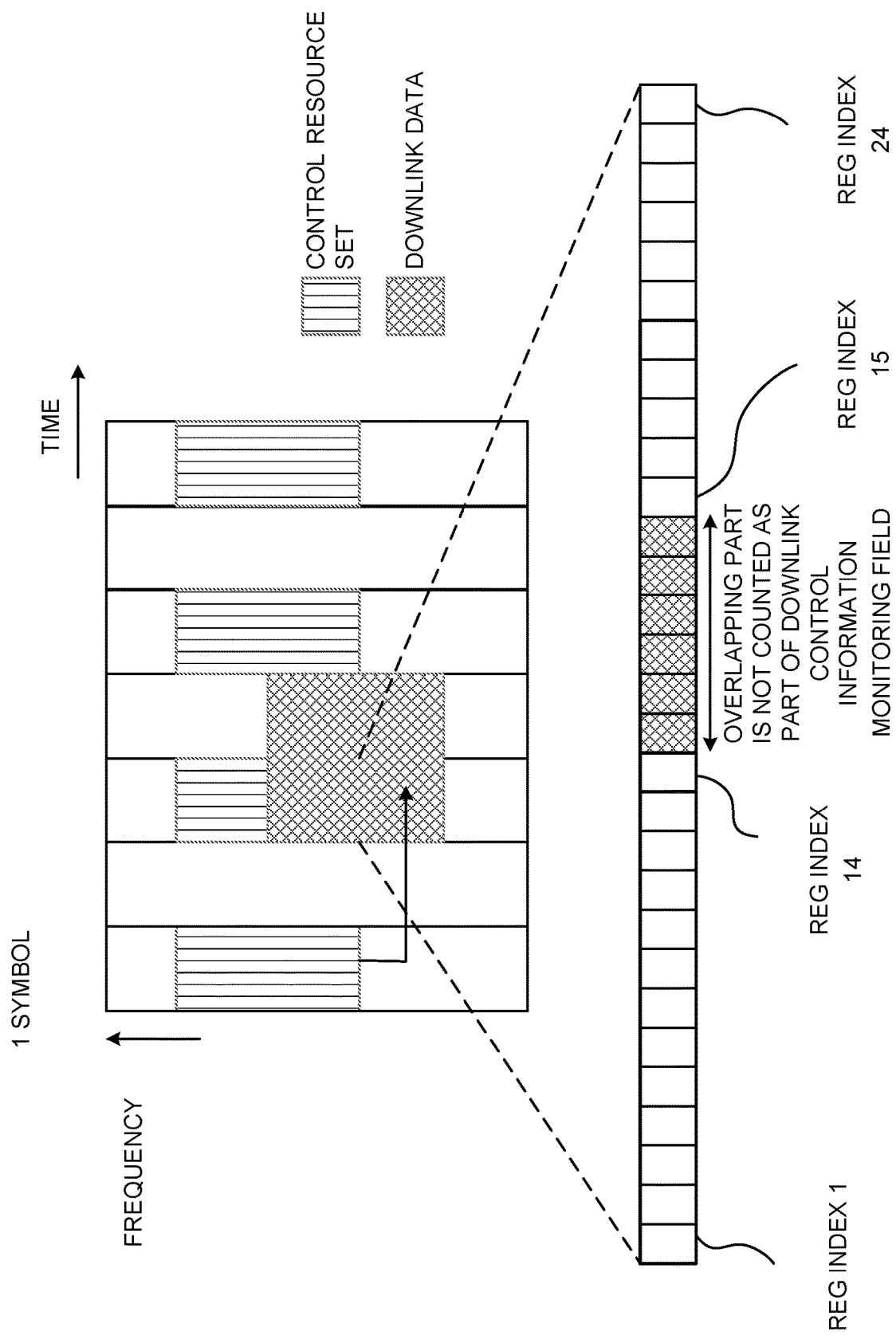
FIG. 11 is a diagram to illustrate an example of allocation of downlink data and control resource sets in radio resources according to the second embodiment.

Examples of configurations according to example 2-2 are illustrated in FIG. 9 and FIG. 10. Here, as in FIG. 8 of example 2-1, control resource sets are configured in the first, third, fifth and seventh symbols, but, in the third symbol, the control resource set collides with broadcast information. Also, the location of downlink data in radio resources is specified by the downlink control channel (downlink control information) transmitted in the control resource set of the first symbol.

FIG. 9 illustrates an example of a configuration in which rate matching or puncturing is applied to portions where the control resource set and the downlink data overlap (option 1). FIG. 10 illustrates an example of a configuration in which rate matching or puncturing is applied to downlink control information (DCI) of a control resource set (option 2).

(Option 1)

The network first maps a downlink control channel (control resource set) on the assumption that the downlink control channel does not overlap with downlink data (selection of mapping resources). After this, downlink data is mapped, but, since the control resource set overlaps with downlink data, the downlink data is subjected to rate matching.

The UE detects (specifies) the control resource set that collides with the downlink data based on information indicating semi-statically-configured locations. The UE monitors the detected control resource set. However, the detected control resource set has a part that overlaps with downlink data, and therefore downlink data around the overlapping part is subjected to rate matching (FIG. 9).

Here, puncturing may be used instead of rate matching. When puncturing is applied to downlink data that is configured semi-statically, although part of the downlink data may not be transmitted, it is still preferable because the downlink data can be transmitted without making the transmission quality of the rest of the downlink data drop, and, furthermore the processes at the receiver can be made common depending on whether or not puncturing is used.

(Option 2)

The network first maps a downlink control channel (DCI) on the assumption that the downlink control channel does not overlap with downlink data (selection of mapping resources). After this, downlink data is mapped, but, since the downlink control channel overlaps with downlink data, the downlink data is subjected to rate matching.

The UE detects (specifies) the control resource set that collides with the downlink data based on information indicating semi-statically-configured locations. The UE monitors the detected control resource set. As a result of this, the DCI is decoded. In the UE, downlink data around the DCI is subjected to rate matching (FIG. 10).

Puncturing is used instead of rate matching, as described earlier (option 1).

According to example 2-2, when a control resource set overlaps with downlink data, the monitoring process can be performed as when there is no overlap. As a result of this, even when control resource sets are configured in a flexible manner, it is still possible to reduce the decline in the quality of communication, the drop in resource efficiency, and so forth.

(Example 2-3)

Next, example 2-3 will be described below. In example 2-3, as in example 1-5, when a control resource set collides with downlink data, the part (resource) that collides with downlink data is not considered as the control resource set, and only the part (resource) that does not collide (does not overlap) with downlink data is regarded as the control resource set and monitored. The behaviors of the network and UE are the same as in example 1-5, except that broadcast information and downlink data are different, and therefore their description will be omitted.

According to example 2-3, a downlink control channel can be allocated using resources that do not collide (do not overlap) with downlink data. In other words, colliding control resource sets can be utilized. Consequently, UE does not perform monitoring, decoding processes and so forth, for resources that collide with downlink data, thereby avoiding unnecessary processes. As a result of this, even when control resource sets are configured in a flexible manner, it is still possible to reduce the decline in the quality of communication, the drop in resource efficiency, and so forth.

Example 2-4

Figure 12:
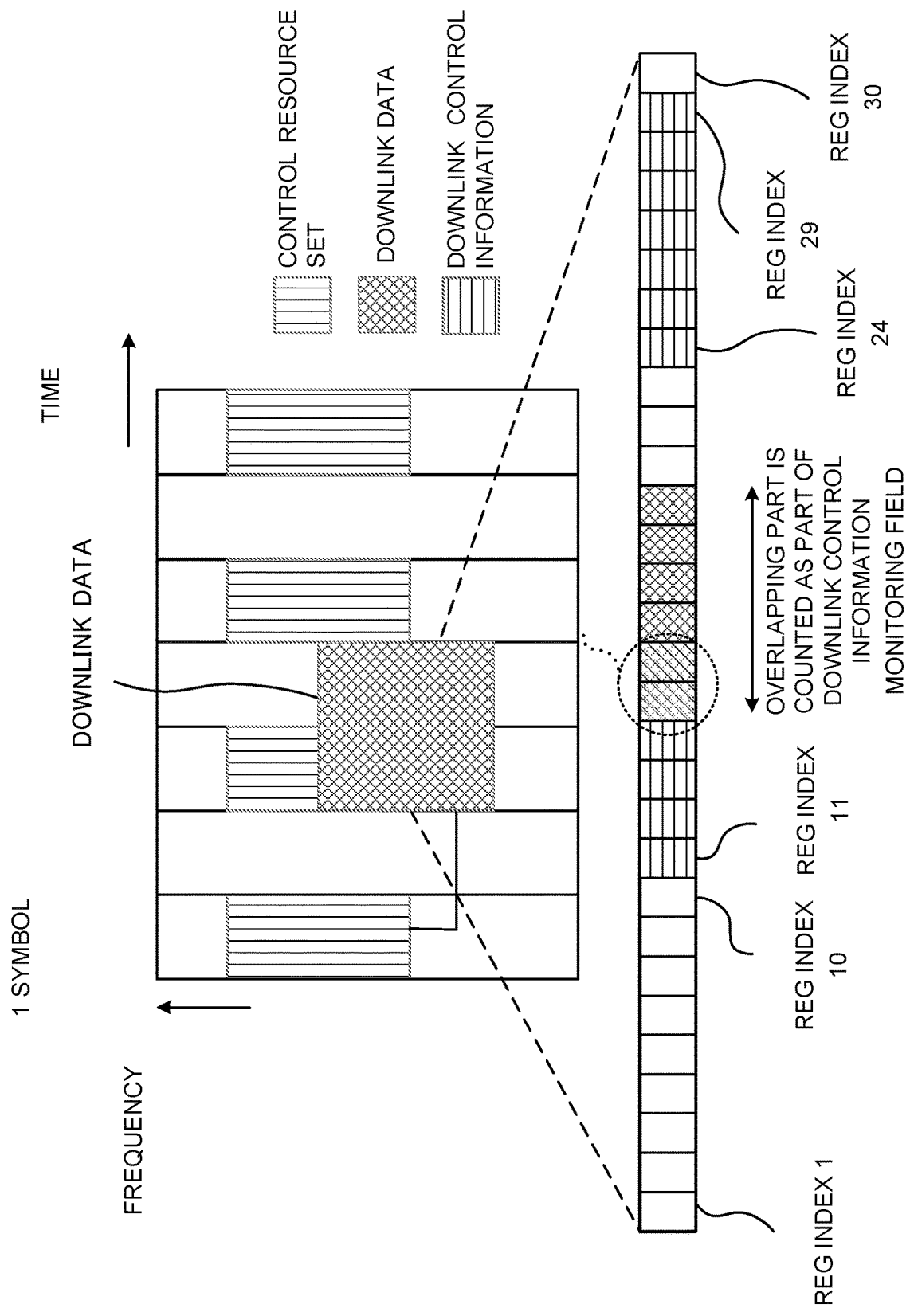
FIG. 12 is a diagram to illustrate an example of allocation of downlink data and control resource sets in radio resources according to the second embodiment.

Next, example 2-4 will be described below. With example 2-4, as in example 1-6, when a control resource set collides with downlink data, the part (resource) that collides with downlink data is also regarded as the control resource set and monitored. Also, in example 2-4, rate matching or puncturing is applied (FIG. 12). The behaviors of the network and UE are the same as in example 1-6, except that broadcast information and downlink data are different, and therefore their description will be omitted.

According to example 2-4, when downlink data is allocated to collide with a control resource set, the decoding process and/or other processes may be performed, using the downlink data as information mapped to that control resource set. The UE can perform the monitoring process, without performing special processes (such as partial monitoring, shifting radio resources, etc.) for colliding control resource sets. As a result of this, even when control resource sets are configured in a flexible manner, it is still possible to reduce the decline in the quality of communication, the drop in resource efficiency, and so forth.

Example 2-5

Figure 13:
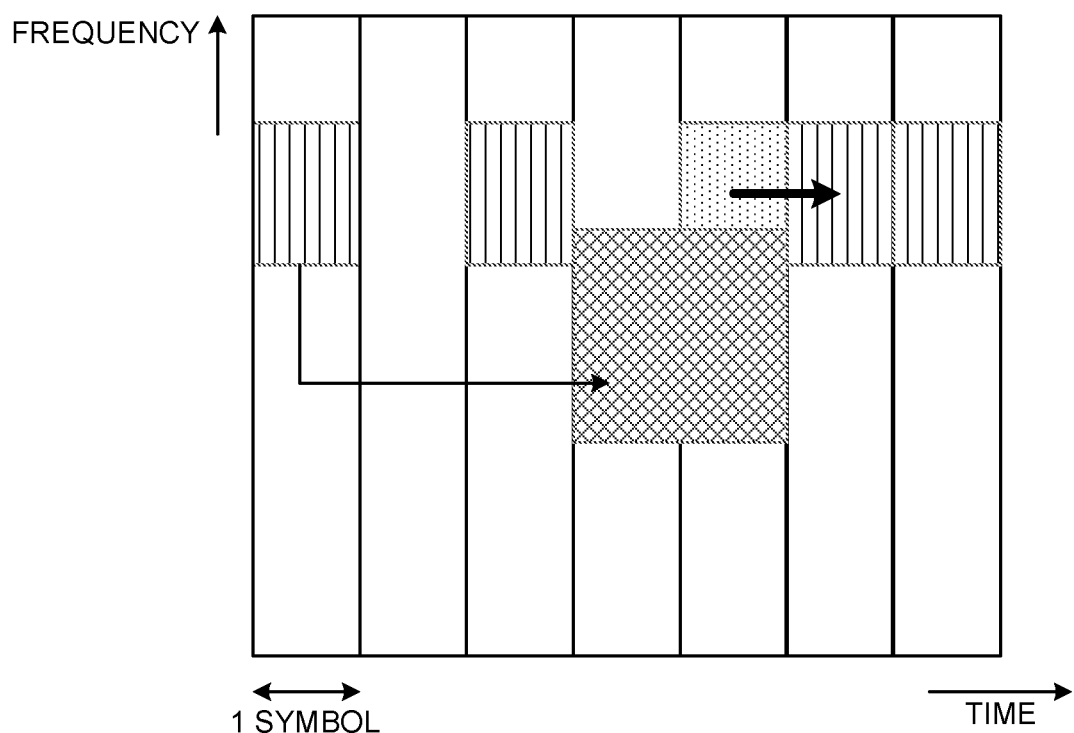
FIG. 13 is a diagram to illustrate an example of allocation of downlink data and control resource sets in radio resources according to the second embodiment.

Next, example 2-5 will be described below. In example 2-5, as in example 1-3, a control resource set that collide with downlink data is shifted in the time-axis direction, and prevented from colliding with downlink data (FIG. 13). The behaviors of the network and UE are the same as in example 1-3, except that broadcast information and downlink data are different, and therefore their description will be omitted.

According to example 2-5, a control resource set that collides with downlink data can be shifted to an effective resource that does not collide with downlink data. Consequently, the UE does not perform monitoring, decoding process and so forth, for resources that collide with downlink data, thereby avoiding unnecessary processes.

Also, a downlink control channel that is mapped to a colliding control resource set is mapped to a resource that does not collide with downlink data (effective resource), so that the drop in resource efficiency can be reduced. Furthermore, there is no need to wait for the next control resource set of the colliding control resource set to transmit a downlink control channel, so that the latency in transmission and so on can be reduced.

Example 2-6

Figure 14:
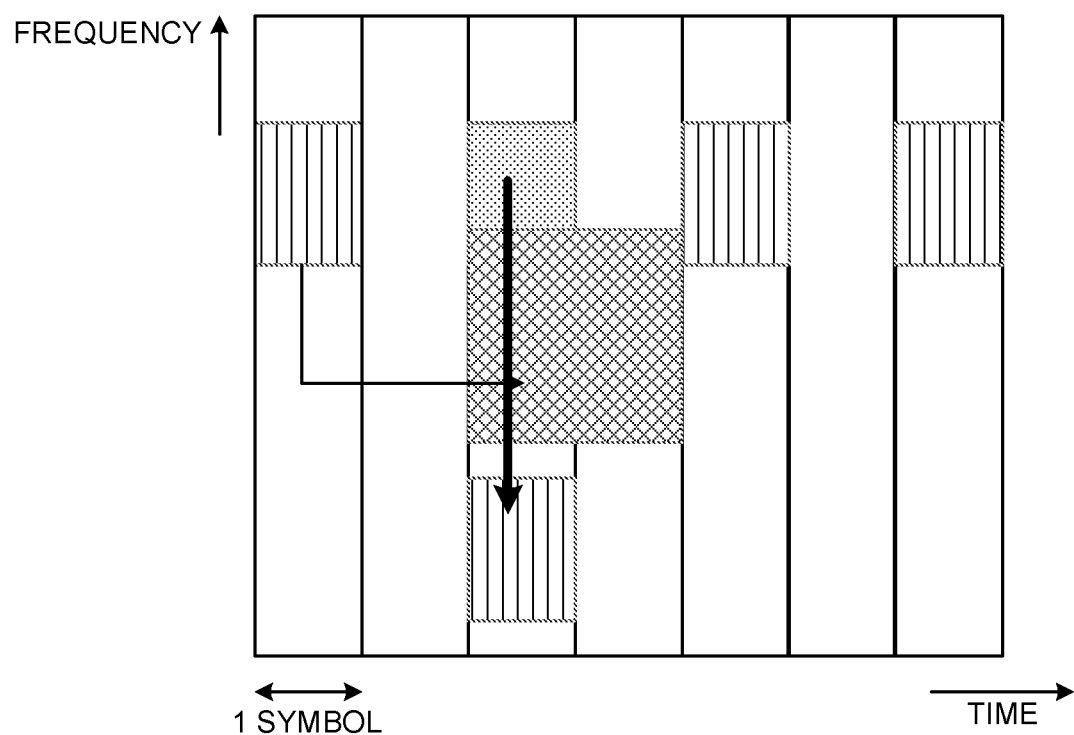
FIG. 14 is a diagram to illustrate an example of allocation of downlink data and control resource sets in radio resources according to the second embodiment.

Next, example 2-6 will be described below. In example 2-6, as in example 1-4, a control resource set that collide with downlink data is shifted in the frequency-axis direction, and prevented from colliding with downlink data (FIG. 14). The behaviors of the network and UE are the same as in example 1-4, except that broadcast information and downlink data are different, and therefore their description will be omitted.

According to example 2-5, a control resource set that collides with downlink data can be shifted to an effective resource that does not collide with downlink data. Consequently, the UE does not perform monitoring, decoding process and so forth, for resources that collide with downlink data, thereby avoiding unnecessary processes.

Also, a downlink control channel that is mapped to a colliding control resource set is mapped to a resource that does not collide with downlink data (effective resource), so that the drop in resource efficiency can be reduced. Furthermore, there is no need to wait for the next control resource set of the colliding control resource set to transmit a downlink control channel, or there is no need to transmit the downlink control channel in a symbol after the colliding symbol, so that the latency in transmission and so on can be reduced.

As described above, according to the second embodiment, when control resource sets are allocated in a flexible manner and control sets collide with downlink data, it is still possible to reduce the decline in the quality of communication, the drop in resource efficiency and so forth.

Third Embodiment

Figure 15:
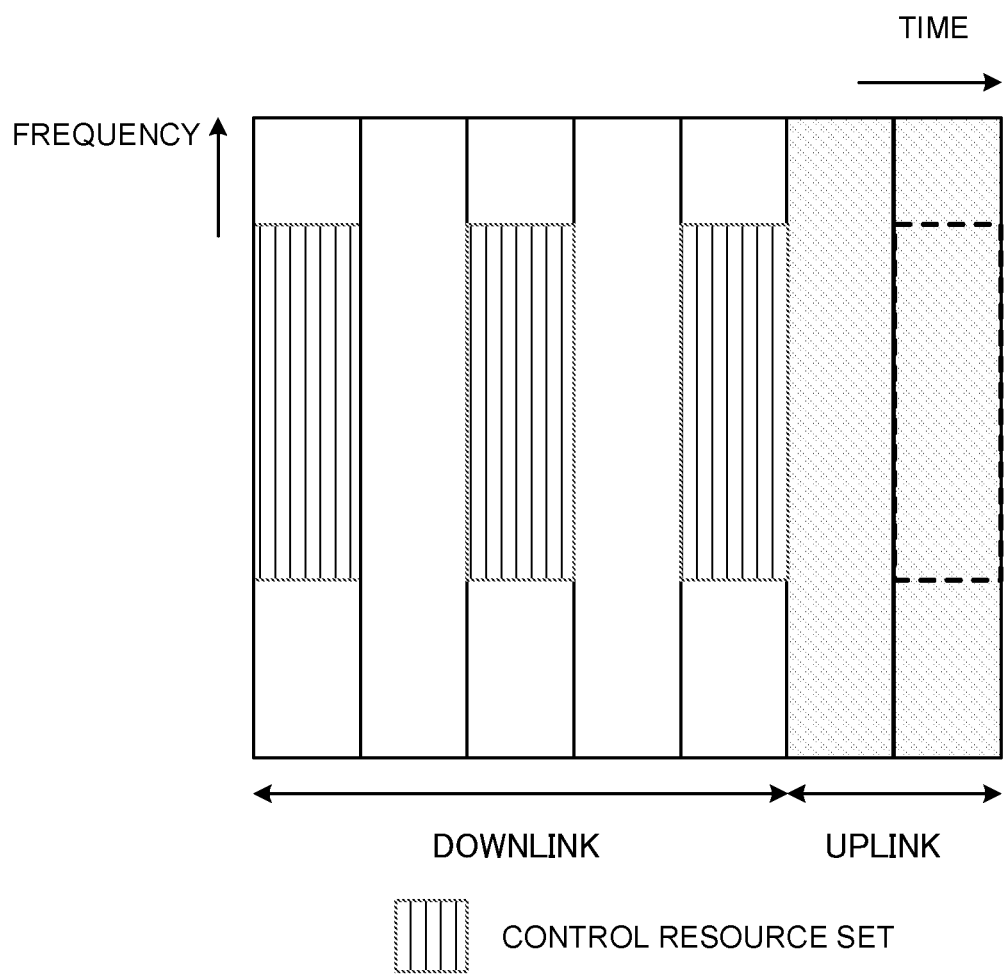
FIG. 15 is a diagram to illustrate an example of allocation of uplink and downlink control resource sets in radio resources according to a third embodiment of the present invention.

Next, a third embodiment of the present invention will be described below. With a third embodiment, a case will be described below, in which radio resources (symbols), to which control resource sets are allocated, are used for the uplink. In a radio communication system (for example, NR), the uplink may be configured dynamically. Consequently, as illustrated in FIG. 15, a symbol to which a control resource set is allocated may be used for the uplink.

The UE detects (specifies) that, a symbol to which a control resource set is allocated is used for the uplink, based on information indicating locations that are reported or determined in advance, and uplink commands that are reported on a dynamic basis. The UE skips monitoring only the detected control resource set. To be more specific, in FIG. 15, the UE skips monitoring the control resource set configured in the seventh symbol.

According to the third embodiment, if a symbol to which a control resource set is allocated is used for the uplink, the UE does not perform monitoring, decoding processes and so forth, only for the corresponding control resource set, thereby avoiding unnecessary processes. As a result of this, even when control resource sets are configured in a flexible manner, it is still possible to reduce the decline in the quality of communication, the drop in resource efficiency, and so forth.

Fourth Embodiment

Next, a fourth embodiment of the present invention will be described below. With the fourth embodiment, a case will be described below, in which a channel state information reference signal (CSI-RS) collides with a control resource set. Now, various examples of the fourth embodiment will be described below.

Example 4-1

Figure 16:
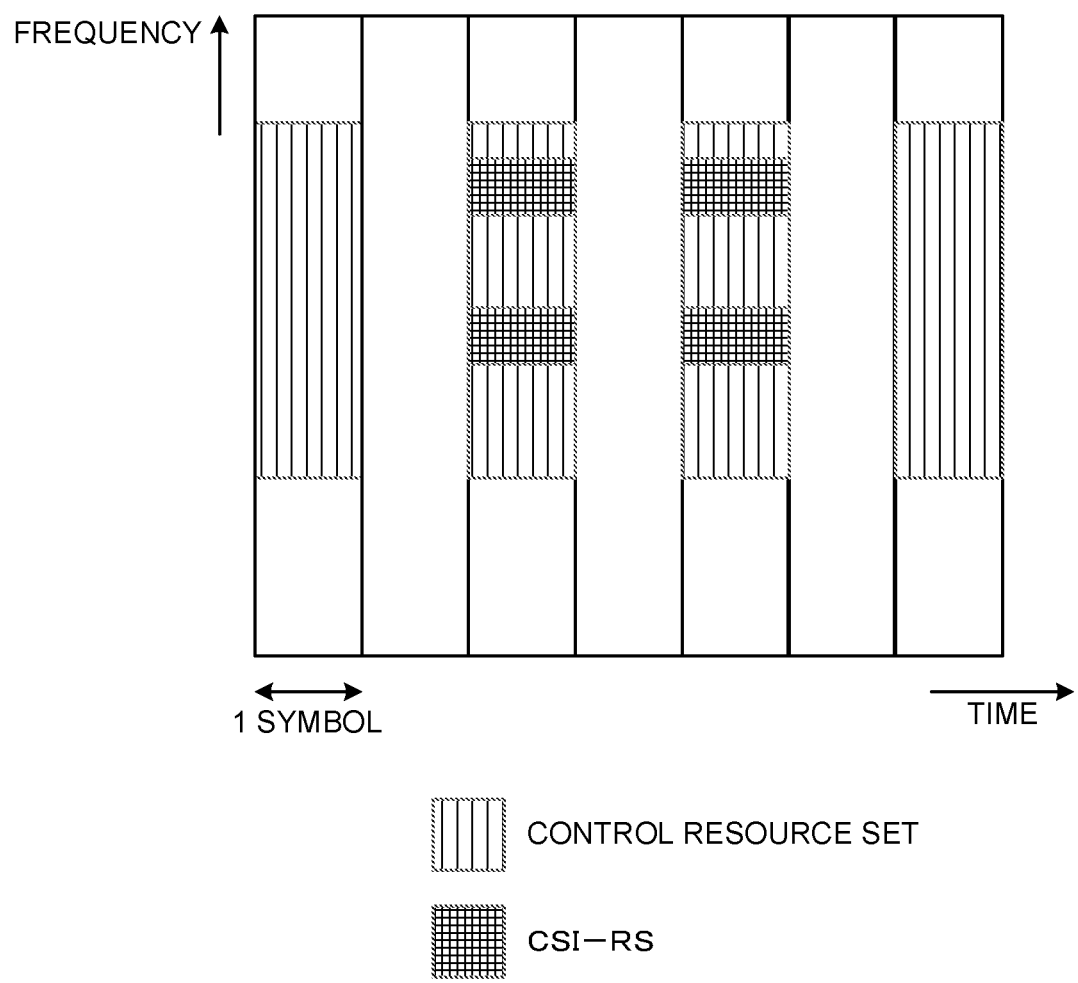
FIG. 16 is a diagram to illustrate an example of allocation of CSI-RSs and control resource sets in radio resources according to a fourth embodiment of the present invention.

First, example 4-1 will be described below. In example 4-1, as in example 1-6, example 2-2 and example 2-4, when a control resource set collides with a CSI-RS, the part (resource) that collides with the CSI-RS is regarded as the control resource set and monitored (FIG. 16). Also, in example 1-6, rate matching or puncturing is applied. The behaviors of the network and the UE are the same as in example 1-6, example 2-2 and example 2-4, except that broadcast information and the CSI-RS are different, and therefore their description will be omitted.

According to example 4-1, A CSI-RS, when allocated to collide with a control resource set, is subjected to decoding and other processes as information that is mapped to the control resource set. UE can perform the monitoring process, without performing special processes (such as partial monitoring, shifting radio resources, etc.) for the colliding control resource set alone. As a result of this, even when control resource sets are configured in a flexible manner, it is still possible to reduce the decline in the quality of communication, the drop in resource efficiency, and so forth.

Example 4-2

Figure 17:
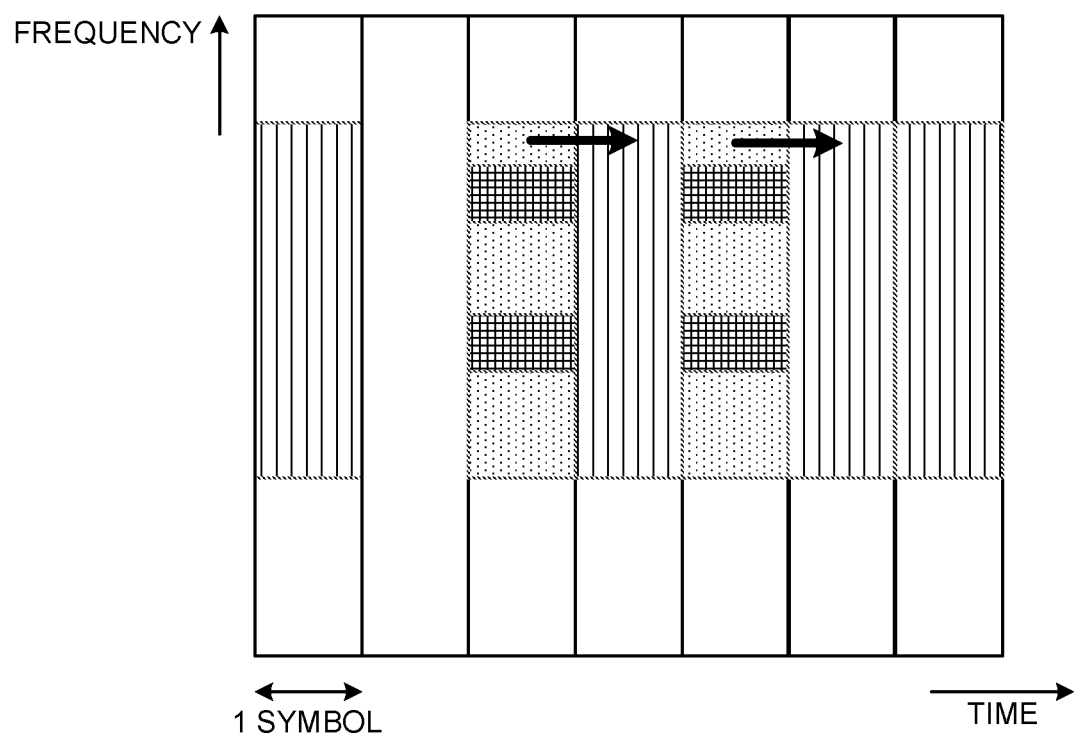
FIG. 17 is a diagram to illustrate an example of allocation of CSI-RSs and control resource sets in radio resources according to the fourth embodiment.

Next, example 4-2 will be described below. In example 4-2, as in example 1-3, a colliding control resource set is shifted in the time-axis direction, and prevented from colliding with a CSI-RS (FIG. 17). The behaviors of the network and UE are the same as in example 1-4, except that broadcast information and the CSI-RS are different, and therefore their description will be omitted.

According to example 4-2, a control resource set that collides with a CSI-RS can be shifted to an effective resource that does not collide with a CSI-RS. Consequently, the UE does not perform monitoring, decoding process and so forth, for the resource colliding with the CSI-RS, thereby avoiding unnecessary processes.

Also, the downlink control channel that is mapped to the colliding control resource set is mapped to a resource (effective resource) that does not collide with the CSI-RS, so that the drop in resource efficiency can be reduced. Furthermore, there is no need to wait for the next control resource set of the colliding control resource set to transmit a downlink control channel, so that the latency in transmission and so on can be reduced.

Example 4-3

Figure 18:
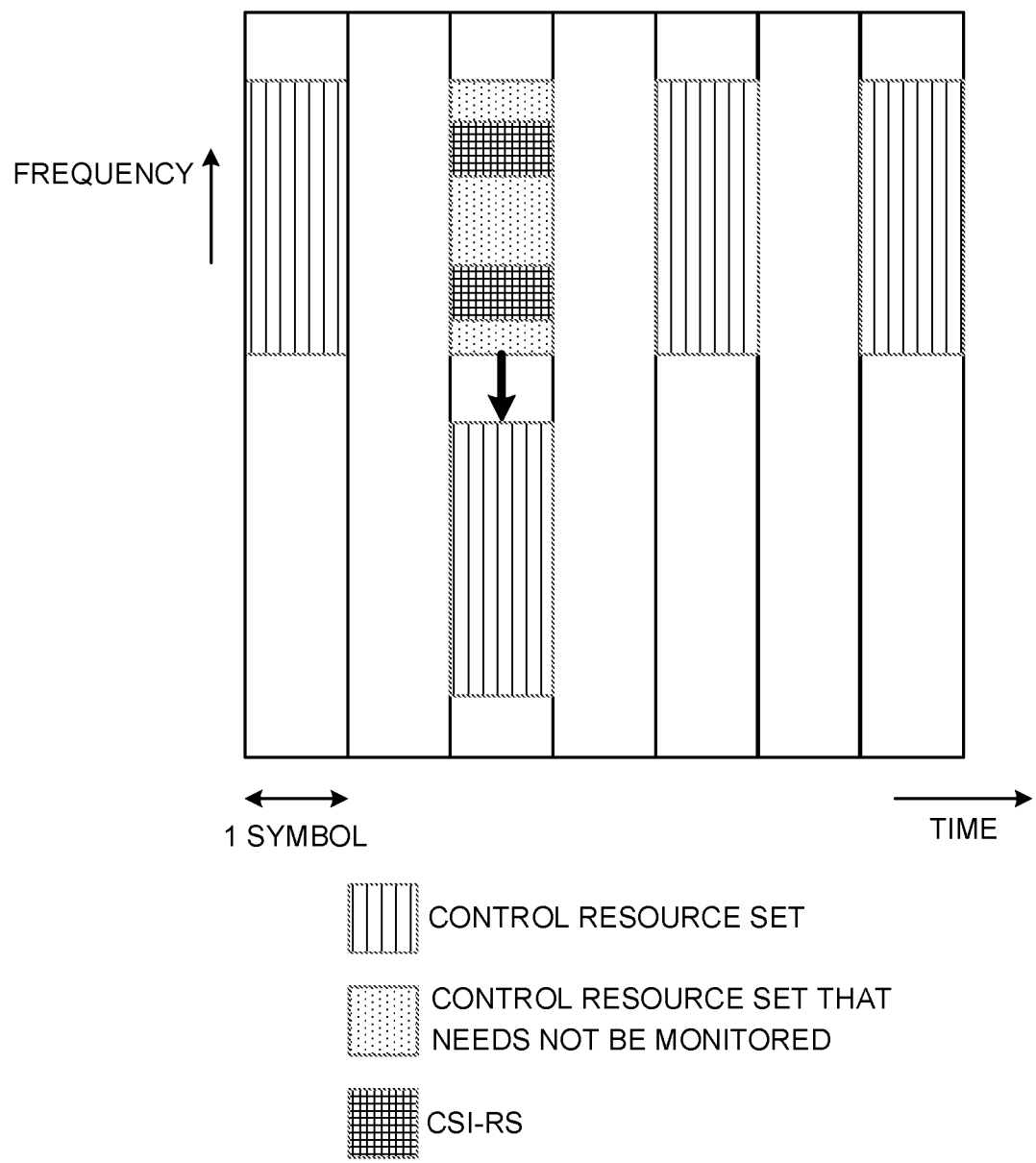
FIG. 18 is a diagram to illustrate an example of allocation of CSI-RS and control resource sets in radio resources according to the fourth embodiment.

Next, example 4-3 will be described below. In example 4-3, as in example 1-4, a colliding control resource set is shifted in the frequency-axis direction, and prevented from colliding with a CSI-RS (FIG. 18). The behaviors of the network and UE are the same as in example 1-4, except that broadcast information and the CSI-RS are different, and therefore their description will be omitted.

According to example 4-3, a control resource set that collides with a CSI-RS can be shifted to an effective resource that does not collide with a CSI-RS. Consequently, the UE does not perform monitoring, decoding process and so forth, for the resource colliding with the CSI-RS, thereby avoiding unnecessary processes.

Also, the downlink control channel that is mapped to the colliding control resource set is mapped to a resource (effective resource) that do not collide with the CSI-RS, so that the drop in resource efficiency can be reduced. Furthermore, there is no need to wait for the next control resource set of the colliding control resource set to transmit a downlink control channel, or there is no need to transmit the downlink control channel in a symbol after the colliding symbol, so that the latency in transmission and so on can be reduced.

As described above, according to the fourth embodiment, when control resource sets are allocated in a flexible manner, and, even if control resource set and the CSI-RS collide with each other, it is still possible to reduce the decline in the quality of communication, the drop in resource efficiency and so forth.

Fifth Embodiment

Next, a fifth embodiment of the present invention will be described below. With the fifth embodiment of the present invention, a case will be described below, in which different control resource sets are allocated to overlap each other. In future systems, multiple types of control resource sets may be configured in UEs or UE groups. Consequently, as illustrated in FIG. 19, different control resource sets may be allocated to overlap each other.

Figure 19:
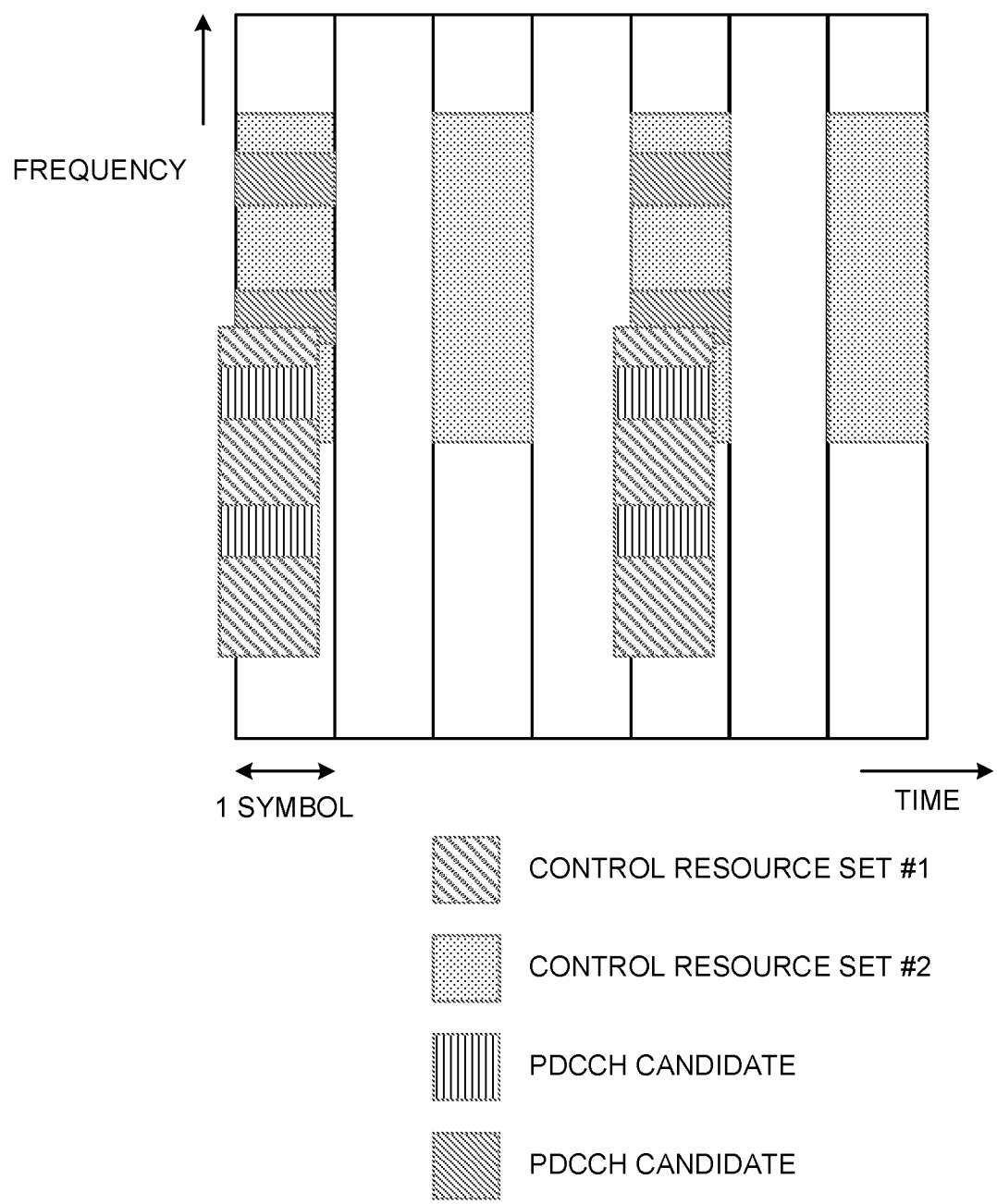
FIG. 19 is a diagram to illustrate an example of allocation of different control resource sets in radio resources according to a fifth embodiment of the present invention.

FIG. 19 illustrates a state of allocation, in which different control resource sets are allocated to overlap each other, partially, in the first and third symbols. In this case, UE performs monitoring on the assumption that there is no overlap in any of the control resource sets. To be more specific, the UE monitors PDCCH candidates/search spaces for each control resource set.

According to the fifth embodiment, the network may transmit a downlink control channel using a preferred control resource set among a plurality of control resource sets. For example, an appropriate control resource set can be used depending on the communication quality or the state of allocation (such as the frequency of configuration) of each control resource set. As a result of this, the decline in the quality of communication, the drop in resource efficiency and so forth can be reduced.

Note that, after one of overlapping control resource sets is shifted in the time-axis direction or the frequency axis direction, UE may monitor both of the control resource sets. This allows the UE to avoid monitoring the same radio resource field in a redundant manner.

(Radio Communication System)

Now, the structure of a radio communication system according to one embodiment of the present invention will be described below. In this radio communication system, communication is performed using 1 of the radio communication methods according to the herein-contained embodiments of the present invention, or a combination of these.

Figure 20:
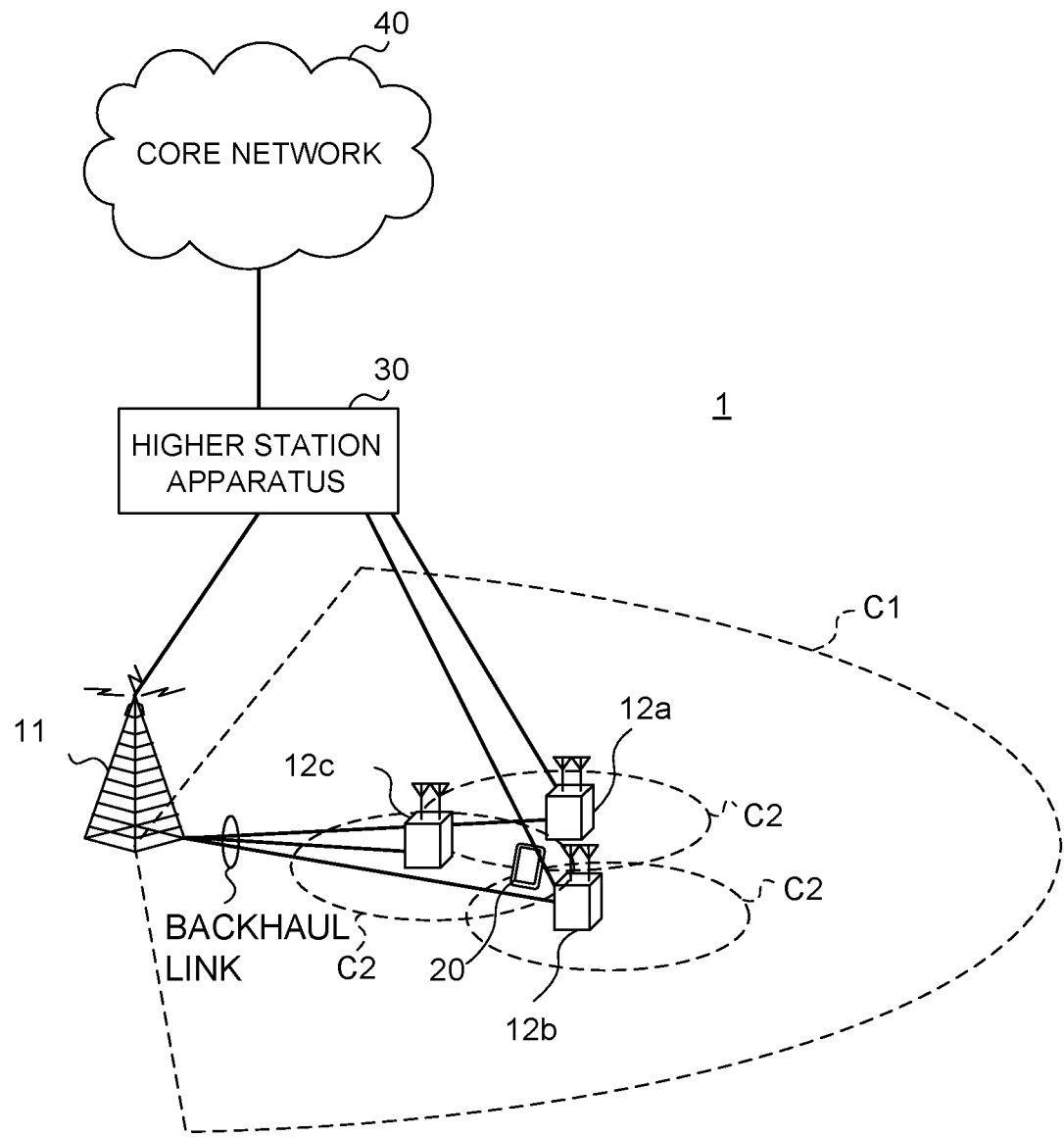
FIG. 20 is a diagram to illustrate an exemplary schematic structure of a radio communication system according to one embodiment of the present invention.

FIG. 20 is a diagram to illustrate an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 21:
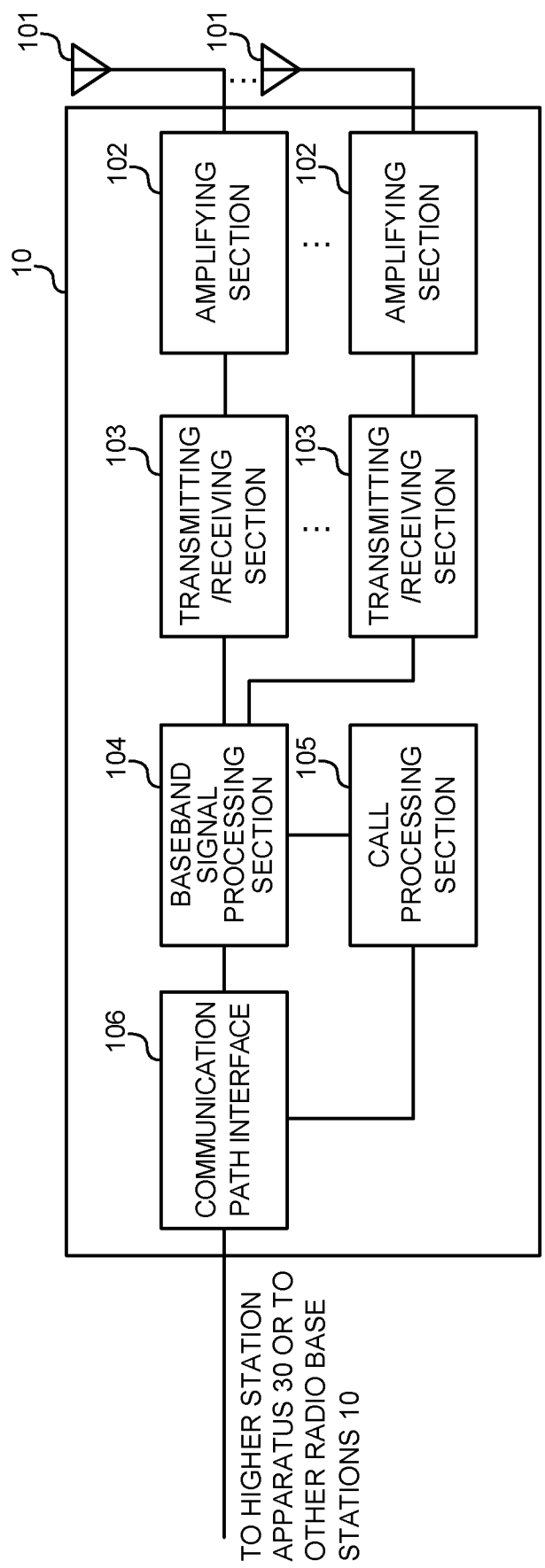
FIG. 21 is a diagram to illustrate an exemplary overall structure of a radio base station according to one embodiment of the present invention.

FIG. 21 is a diagram to illustrate an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit signals using transmitting beams, or receive signals using receiving beams. The transmitting/receiving sections 103 may transmit and/or receive signals using predetermined beams determined by the control section 301.

The transmitting/receiving sections 103 transmit one or more synchronization signal blocks (SS blocks) that contain synchronization signals (for example, the NR-PSS, NR-SSS, etc.) and a broadcast channel (for example, the NR-PBCH). The transmitting/receiving sections 103 may transmit the NR-PBCH with the same content and/or of the same configuration by using different multiple SS blocks.

The transmitting/receiving sections 103 may transmit at least 1 set of control resource, broadcast information, downlink data, and CSI-RS.

Figure 22:
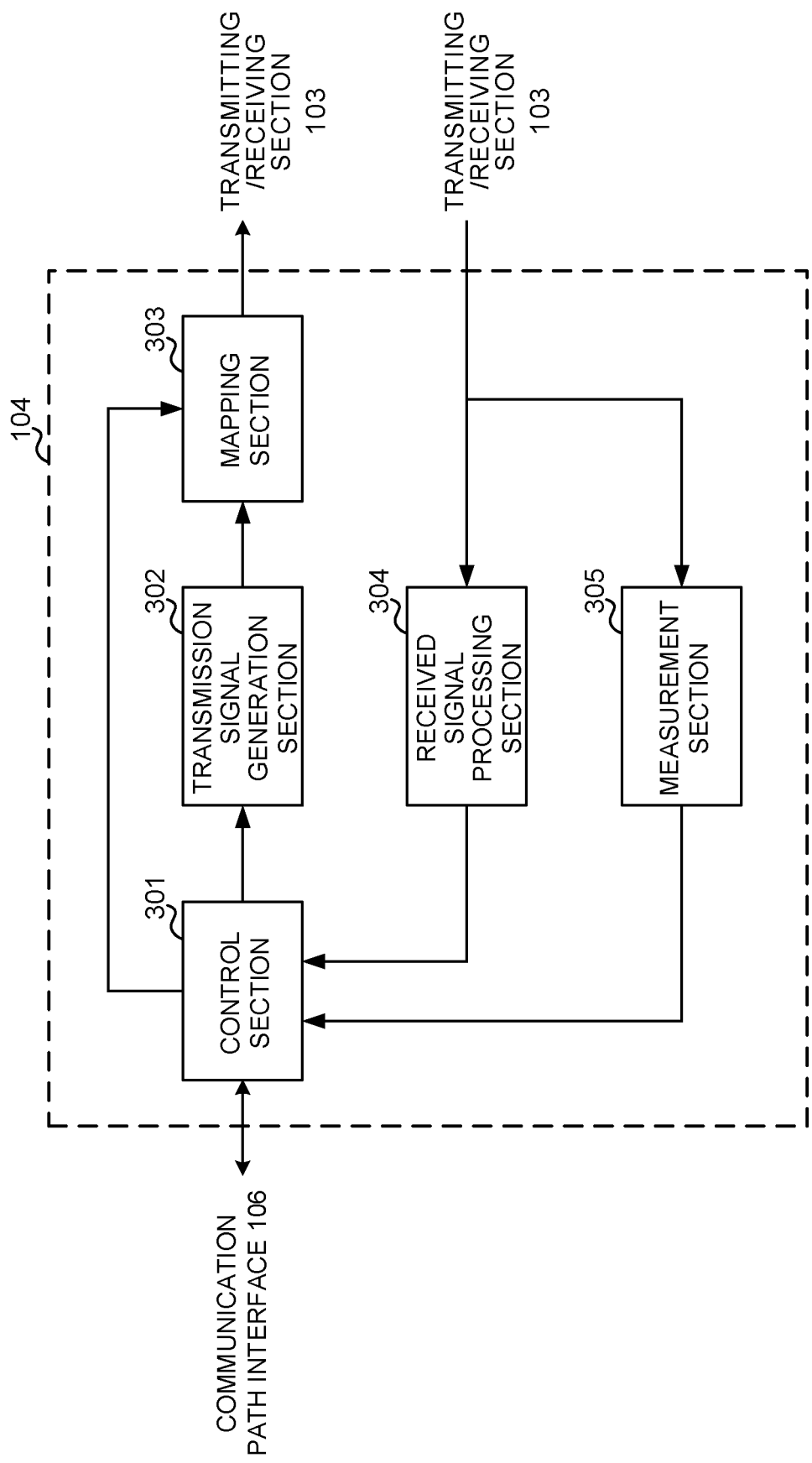
FIG. 22 is a diagram to illustrate an exemplary functional structure of a radio base station according to one embodiment of the present invention.

FIG. 22 is a diagram to illustrate an exemplary functional structure of a radio base station according to one embodiment of the present invention. Note that, although this example primarily illustrates functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDCCH and/or the EPDCCH). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that transmitting beams and/or receiving beams are formed by using digital BF (for example, precoding) in the baseband signal processing section 104 and/or analog BF (for example, phase rotation) in the transmitting/receiving sections 103. The control section 301 may exert control so that beams are formed based on downlink propagation path information, uplink propagation path information and so on. These pieces of propagation path information may be obtained from the received signal processing section 304 and/or the measurement section 305.

The control section 301 may explicitly command, by using RRC signaling or SIBs, the user terminal 20 not to decode the PBCH included in other cells' SS blocks.

Also, the control section 301 transmits various downlink signals described in the first to fifth embodiments.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with corresponding DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), propagation path information (for example, CSI), and so on. The measurement results may be output to the control section 301.

(User Terminal)

Figure 23:
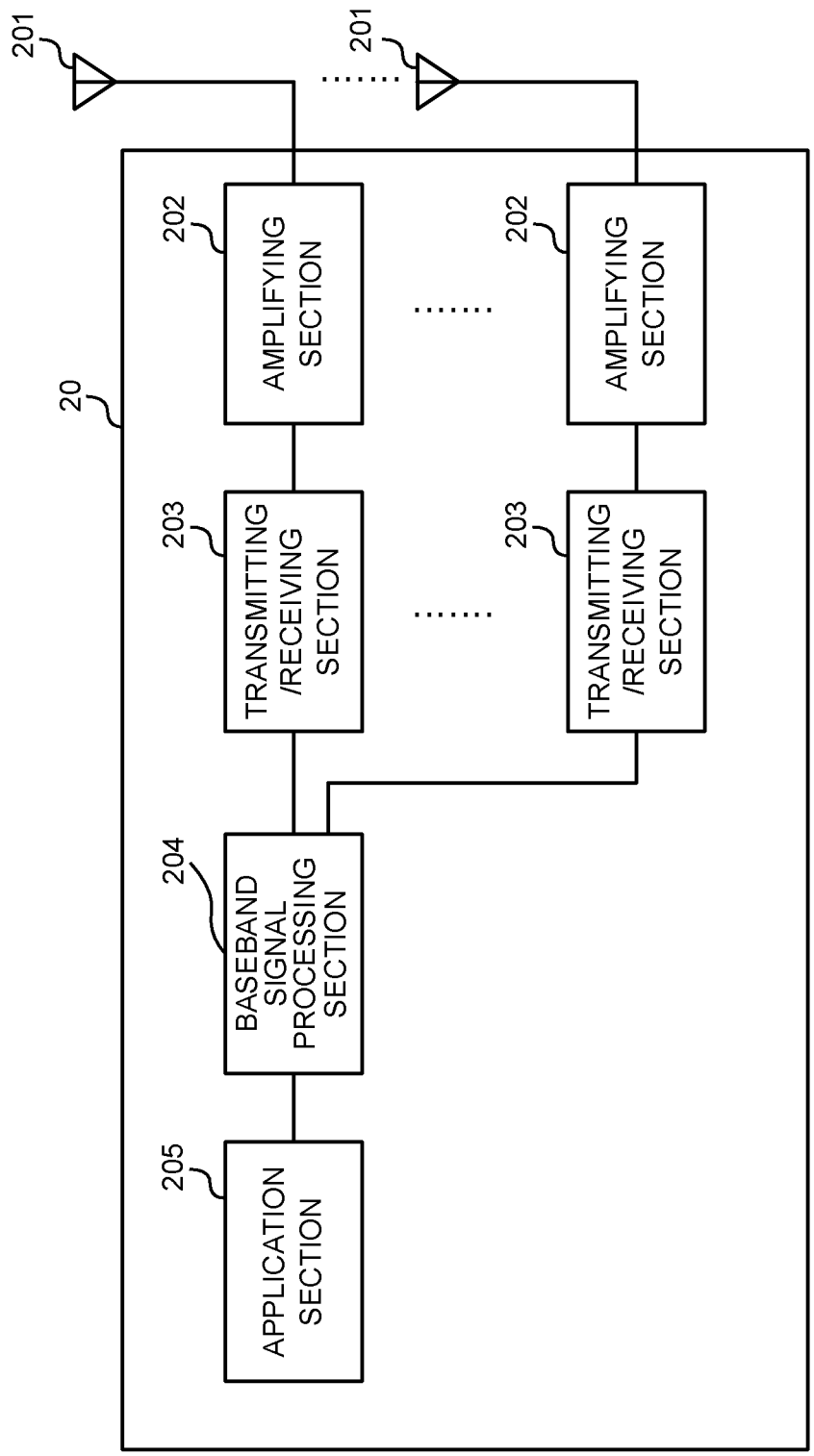
FIG. 23 is a diagram to illustrate an exemplary overall structure of a user terminal according to one embodiment of the present invention.

FIG. 23 is a diagram to illustrate an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 may transmit signals using transmitting beams, or receive signals using receiving beams. The transmitting/receiving sections 203 may transmit and/or receive signals using predetermined beams determined by the control section 401.

The transmitting/receiving sections 203 receive one or more synchronization signal blocks (SS blocks) that contain synchronization signals (for example, the NR-PSS, NR-SSS, etc.) and a broadcast channel (for example, the NR-PBCH).

Also, the transmitting/receiving sections 203 receive various downlink signals described in the first to fifth embodiments.

Figure 24:
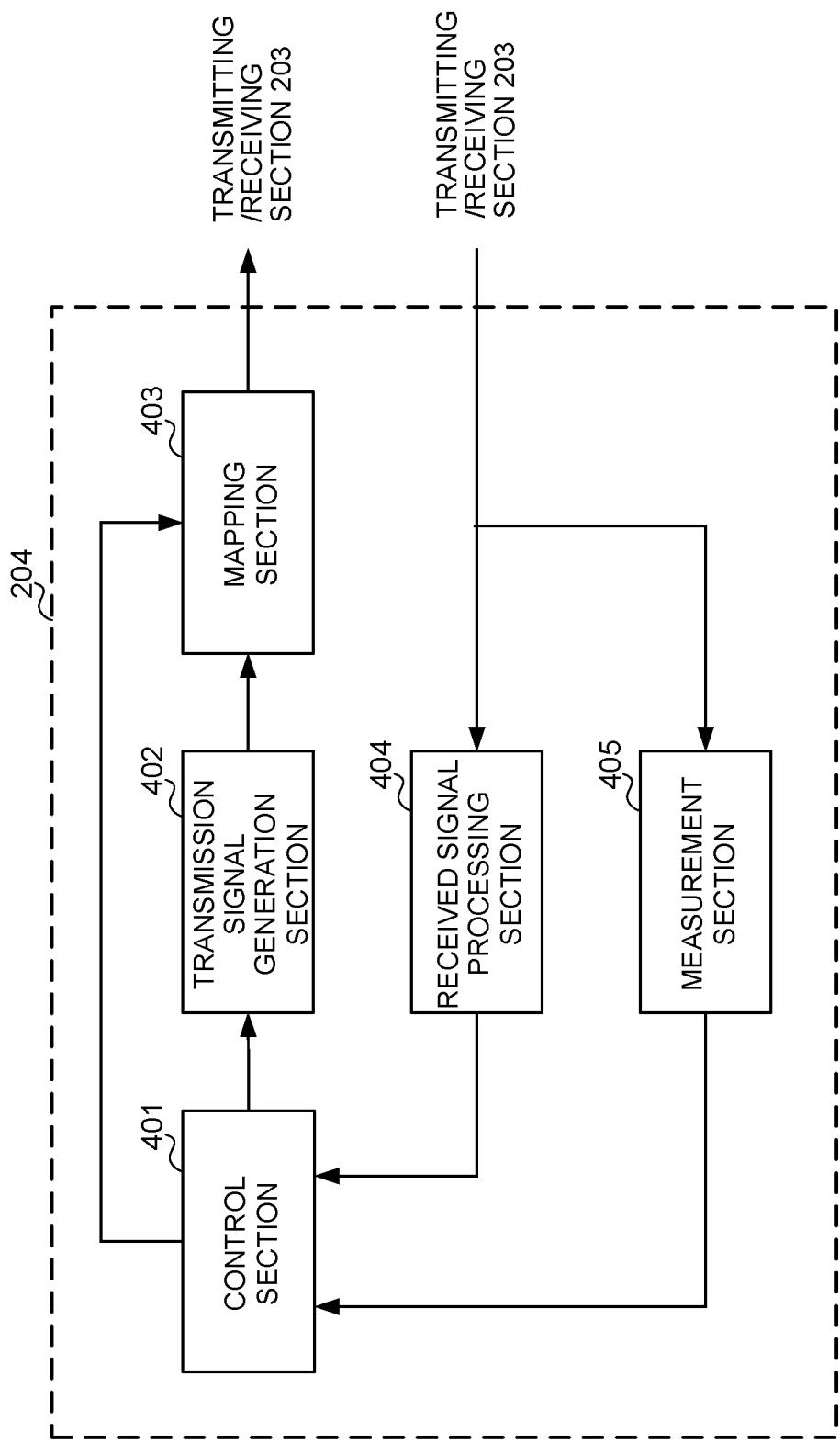
FIG. 24 is a diagram to illustrate an exemplary functional structure of a user terminal according to one embodiment of the present invention.

FIG. 24 is a diagram to illustrate an exemplary functional structure of a user terminal according to one embodiment of the present invention. Note that, although this example primarily illustrates functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed by using digital BF (for example, precoding) in the baseband signal processing section 204 and/or analog BF (for example, phase rotation) in the transmitting/receiving sections 203. The control section 401 may exert control so that beams are formed based on downlink propagation path information, uplink propagation path information, and so on. These pieces of propagation path information may be obtained from the received signal processing section 404 and/or the measurement section 405.

The control section 401 controls the control resource set as described in the first to fifth embodiments.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), propagation path information (for example, CSI) and so on. The measurement results may be output to the control section 401.

(Hardware Structure)

Note that the block diagrams that have been used to describe the above embodiments illustrate blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 25:
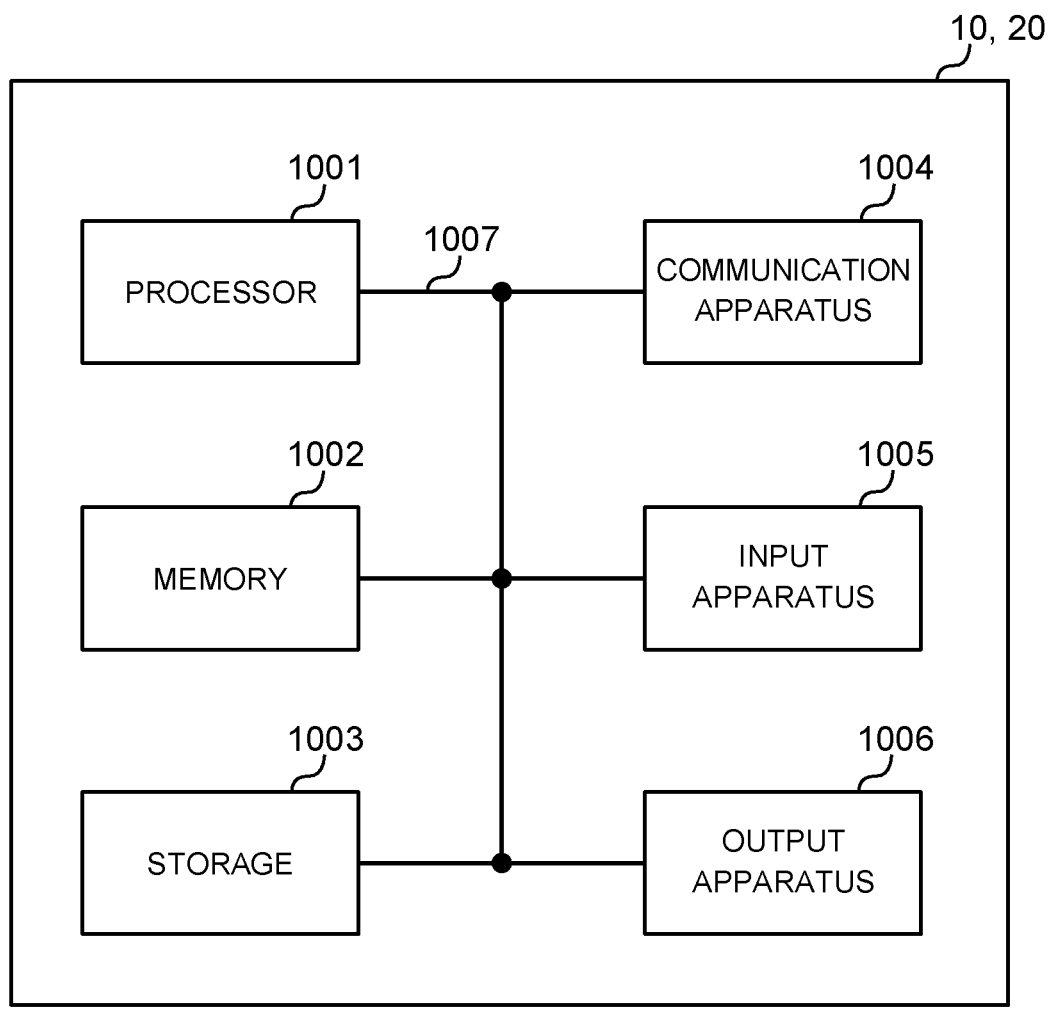
FIG. 25 is a diagram to illustrate an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 25 is a diagram to illustrate an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus illustrated in the drawings, or may be designed not to include part of the apparatus.

For example, although only 1 processor 1001 is illustrated, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments explained in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been explained in this specification with various components of steps in exemplary orders, the specific orders that are explained herein are by no means limiting.

The aspects/embodiments explained in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives information regarding a control resource set including a downlink control channel candidate; and
   a processor that monitors the downlink control channel candidate,
   wherein the processor is not requested to monitor the downlink control channel candidate when a synchronization signal (SS) block containing an SS overlaps with the downlink control channel candidate, and
   wherein a resource corresponding to a downlink control channel is an unavailable resource for downlink data when the control resource set overlaps with the downlink data.

2. The terminal according to claim 1, wherein the downlink data is not mapped to the unavailable resource.

3. The terminal according to claim 1, wherein the downlink data is rate matched around the unavailable resource.

4. The terminal according to claim 1, wherein the processor skips monitoring of the downlink control channel candidate when the downlink control channel candidate overlaps with the SS block.

5. The terminal according to claim 2, wherein the downlink data is rate matched around the unavailable resource.

6. The terminal according to claim 2, wherein the processor skips monitoring of the downlink control channel candidate when the downlink control channel candidate overlaps with the SS block.

7. The terminal according to claim 3, wherein the processor skips monitoring of the downlink control channel candidate when the downlink control channel candidate overlaps with the SS block.

8. A radio communication method for a terminal, comprising:
   receiving information regarding a control resource set including a downlink control channel candidate; and
   monitoring the downlink control channel candidate,
   wherein the monitoring of the downlink control channel candidate is not requested when a synchronization signal (SS) block containing an SS overlaps with the downlink control channel candidate, and
   wherein a resource corresponding to a downlink control channel is an unavailable resource for downlink data when the control resource set overlaps with the downlink data.

9. A base station comprising:
   a processor that generates information regarding a control resource set including a downlink control channel candidate; and
   a transmitter that transmits the information to a terminal,
   wherein the terminal is not requested to monitor the downlink control channel candidate when a synchronization signal (SS) block containing an SS overlaps with the downlink control channel candidate, and
   wherein a resource corresponding to a downlink control channel is an unavailable resource for downlink data when the control resource set overlaps with the downlink data.

10. A system comprising a terminal and a base station, wherein:
    the terminal comprises:
       a receiver that receives information regarding a control resource set including a downlink control channel candidate; and
       a processor of the terminal that monitors the downlink control channel candidate, and
    the base station comprises:
       a processor of the base station that generates the information; and
       a transmitter that transmits the information,
    wherein the processor of the terminal is not requested to monitor the downlink control channel candidate when a synchronization signal (SS) block containing an SS overlaps with the downlink control channel candidate, and
    wherein a resource corresponding to a downlink control channel is an unavailable resource for downlink data when the control resource set overlaps with the downlink data.

* * * * *